United States Patent
Furukawa

(10) Patent No.: US 9,121,919 B2
(45) Date of Patent: Sep. 1, 2015

(54) TARGET TRACKING DEVICE AND TARGET TRACKING METHOD

(75) Inventor: Hidetoshi Furukawa, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 600 days.

(21) Appl. No.: 13/403,310

(22) Filed: Feb. 23, 2012

(65) Prior Publication Data

US 2012/0221273 A1    Aug. 30, 2012

(30) Foreign Application Priority Data

Feb. 25, 2011    (JP) ................. 2011-040364

(51) Int. Cl.
*G01S 13/66* (2006.01)
*G01S 13/72* (2006.01)
*G01S 7/00* (2006.01)
*G01S 13/86* (2006.01)

(52) U.S. Cl.
CPC ............ *G01S 7/003* (2013.01); *G01S 13/726* (2013.01); *G01S 13/86* (2013.01)

(58) Field of Classification Search
CPC ............ G06F 17/00; G06F 17/10–17/11; G06F 17/16–17/18; G01S 13/00; G01S 13/02; G01S 13/0218; G01S 13/04; G01S 13/06; G01S 13/50; G01S 13/58; G01S 13/588; G01S 13/589; G01S 13/64; G01S 13/66; G01S 13/68; G01S 13/70; G01S 13/72; G01S 13/88; G01S 13/885; G01S 2205/00

USPC ........ 702/94, 33, 95, 97, 127, 143, 149–151, 702/155, 158–159, 189, 196; 342/73, 342/95–96, 104, 106–109, 118; 703/2

See application file for complete search history.

(56) References Cited

FOREIGN PATENT DOCUMENTS

| JP | 6-94830 | 4/1994 |
|----|---------|--------|
| JP | 7-128436 | 5/1995 |
| JP | 2002-181926 | 6/2002 |
| JP | 2009-38777 | 2/2009 |
| JP | 2011-47882 | 3/2011 |

OTHER PUBLICATIONS

Chen et al., Track Association and Fusion with Heterogeneous Local Trackers, Dec. 12-14, 2007, Proceedings of the 46th IEEE Conference on Decision and Control, New Orleans, LA, pp. 2675-2680.*

(Continued)

*Primary Examiner* — Toan Le

(74) *Attorney, Agent, or Firm* — Oblon, McClelland, Maier & Neustadt, L.L.P.

(57) ABSTRACT

According to one embodiment, target tracking device includes passive processor, active processor, fusion unit and correction unit. Passive processor calculates passive track of target based on passive measurement of target angle measured by passive sensor. Active processor calculates active track of target based on active measurement of target distance and angle measured by active sensor. Fusion unit combines passive track and active track to output combined track. Correction unit calculates correction data based on combined track. Passive processor calculates track of the target for motion models based on passive measurement and correction data and calculates passive track by weighted sum of all tracks for motion models.

12 Claims, 10 Drawing Sheets

(56) References Cited

OTHER PUBLICATIONS

D. Howard et al., "Tracking Radar", in Radar Handbook, $2^{nd}$ ed., ch. 18, ed. M. Skolnik, McGraw-Hill, New York, 1990, pp. 18.24-18.25.

Radar Technology (Revised Version), ed. Takashi Yoshida (The Institute of Electronics, Information and Communication Engineers, 1996), pp. 264-267 (with a Partial English Translation).

Y. Bar-Shalom et al., Estimation with Applications to Tracking and Navigation, Wiley-Interscience, 2001, pp. 452-455.

S. S. Blackman, Multiple-Target Tracking with Radar Applications, Article House, 1986, pp. 362-367.

Masayoshi Ito et al., "Tracking a 3-dimensional Moving Target with Distributed Passive Sensors Using Extended Kalman Filter", IEICE Transactions (B), May 1999, vol. J82-B, No. 5, pp. 1066-1067 (with a Partial English Translation).

S. Blackman, Chapter 6 in Multitarget-Multisensor Tracking Advanced Applications, Artech House, 1989, pp. 212-214.

\* cited by examiner

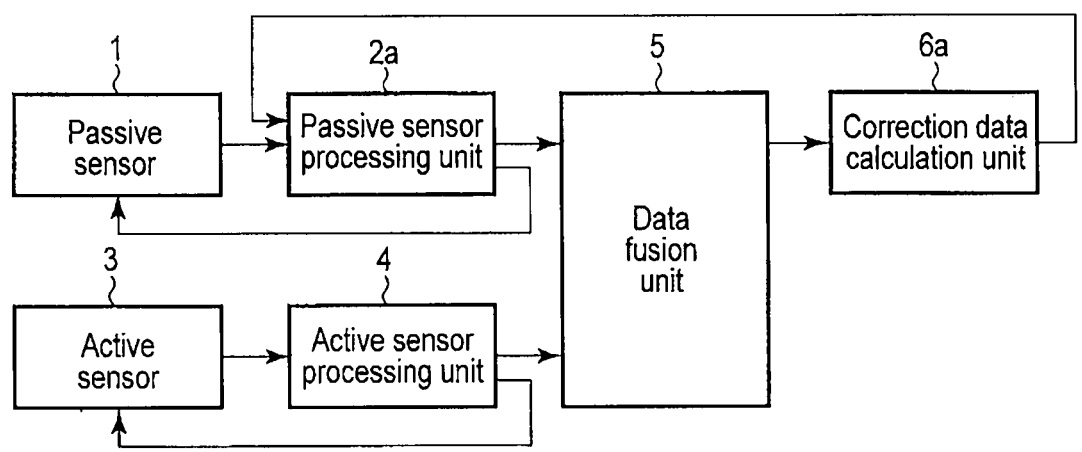
F I G. 1

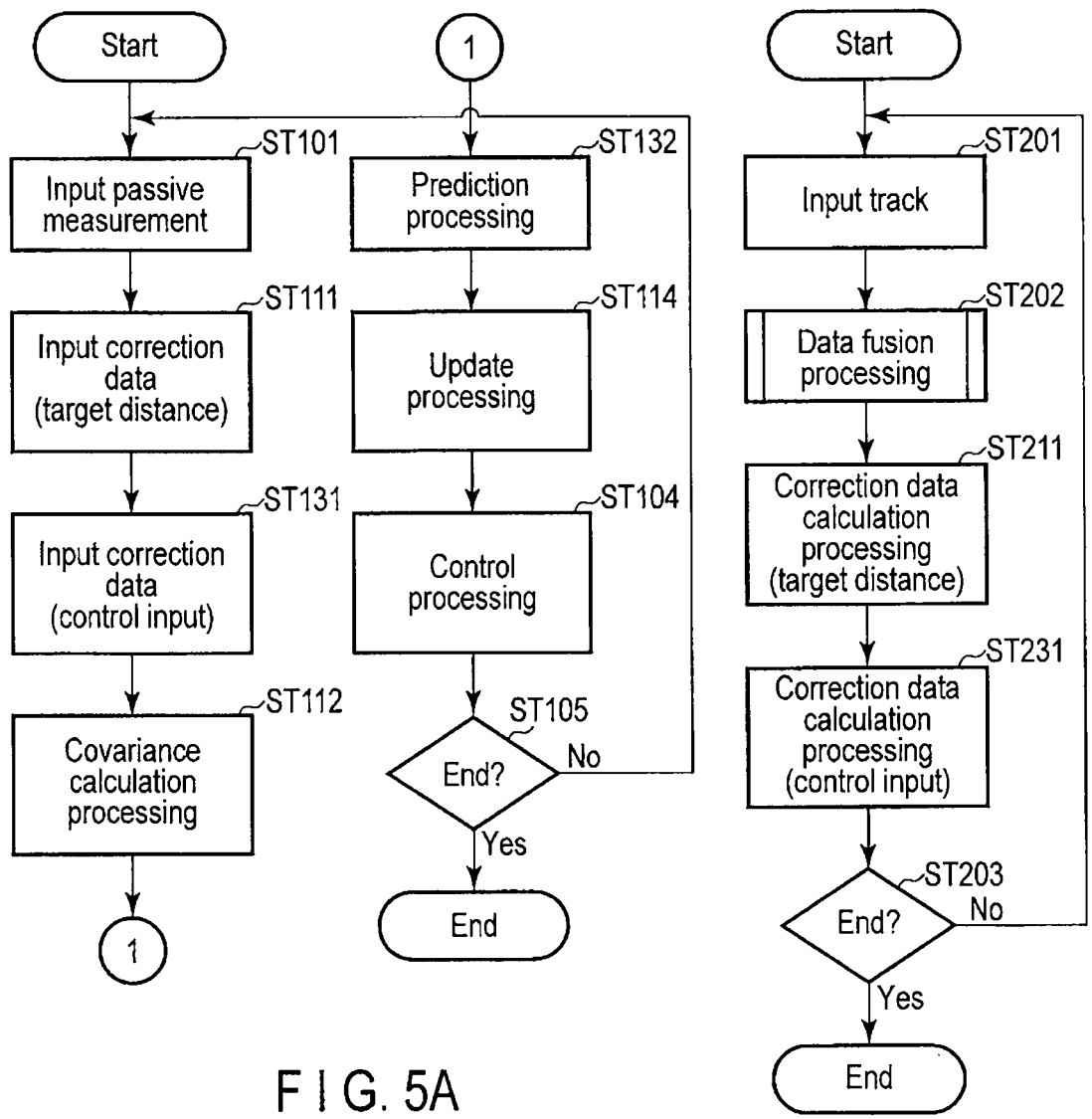
F I G. 5A
F I G. 5B

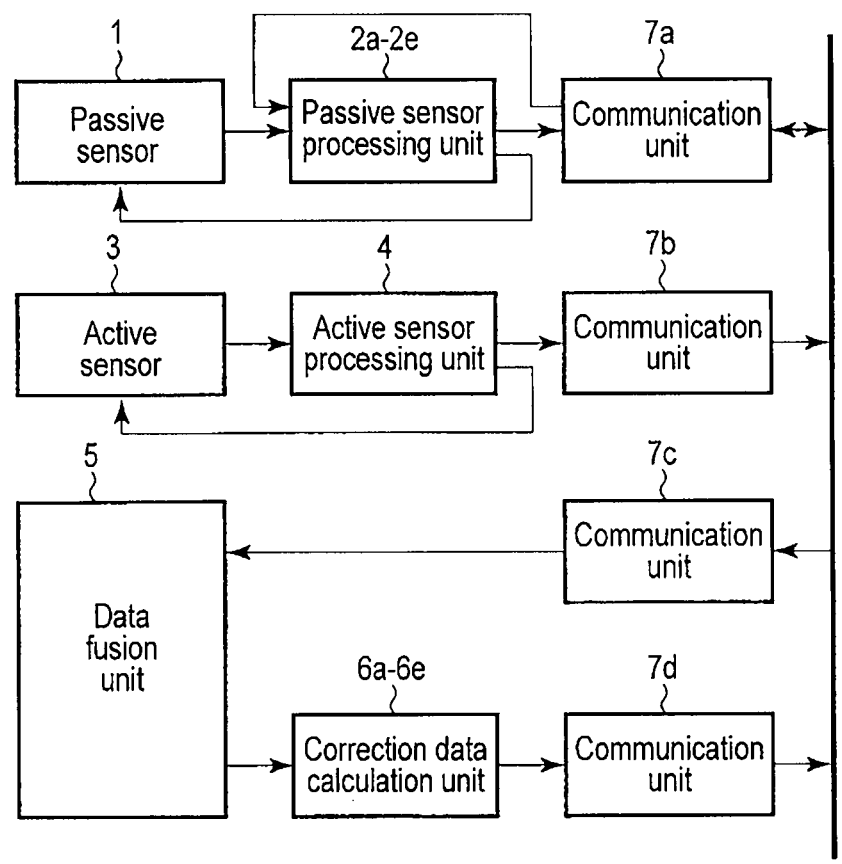
F I G. 7

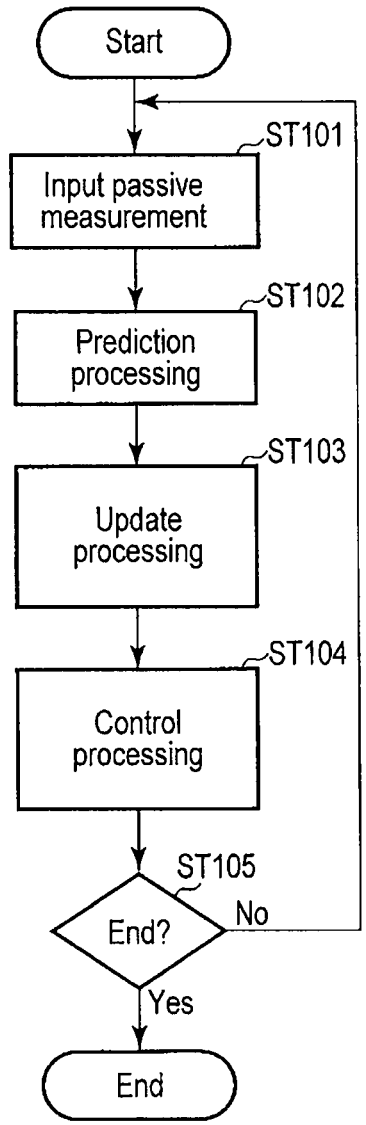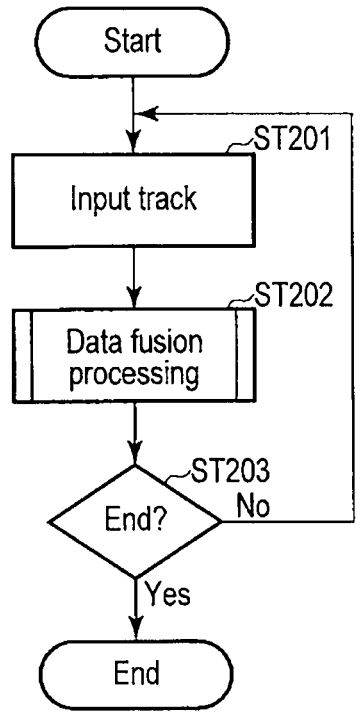
PRIOR ART
FIG. 10A
PRIOR ART
FIG. 10B

TARGET TRACKING DEVICE AND TARGET TRACKING METHOD

CROSS-REFERENCE TO RELATED APPLICATIONS

This application is based upon and claims the benefit of priority from prior Japanese Patent Application No. 2011-040364, filed Feb. 25, 2011, the entire contents of which are incorporated herein by reference.

FIELD

Embodiments described herein relate generally to a target tracking device and a target tracking method which track a target using an active sensor and a passive sensor.

BACKGROUND

FIG. 9 is a block diagram showing an example of a conventional target tracking device. This target tracking device comprises a passive sensor 1, a passive sensor processing unit 2, an active sensor 3, an active sensor processing unit 4, and a data fusion unit 5. The active sensor 3 and the active sensor processing unit 4 are external devices.

The passive sensor 1 measures the angle of a radio wave, infrared rays, a sound wave, or the like radiated (and reradiated) from a target. That is, the passive sensor 1 measures the angle of the target, thereby obtaining passive measurement of the target angle (i.e. goniometric data; hereinafter it is called as passive measurement). The passive sensor 1 sends the passive measurement to the passive sensor processing unit 2.

The passive sensor processing unit 2 calculates a predicted state and an updated state (i.e. a smoothed state) based on the passive measurement from the passive sensor 1. The passive sensor processing unit 2 sends the predicted state and the updated state to the data fusion unit 5 as the target track. Based on the target track, the passive sensor processing unit 2 generates a control signal to control the posture and the like of the passive sensor 1, and sends the signal to the passive sensor 1.

The active sensor 3 radiates an electromagnetic wave or a sound wave. The active sensor 3 measures the distance and angle of the electromagnetic wave or sound wave reflected by the target. That is, the active sensor 3 measures the distance and angle of the target, thereby obtaining active measurement of the target distance and angle (hereinafter it is called as active measurement). The active sensor 3 sends the active measurement to the active sensor processing unit 4.

Like the passive sensor processing unit 2, the active sensor processing unit 4 calculates a predicted state and an updated state based on the active measurement from the active sensor 3. The active sensor processing unit 4 sends the predicted state and the updated state to the data fusion unit 5 as the target track. Based on the target track, the active sensor processing unit 4 generates a control signal to control the posture and the like of the active sensor 3, and sends the signal to the active sensor 3.

The data fusion unit 5 determines whether the target track from the passive sensor processing unit 2 and that from the active sensor processing unit 4 correspond to the same target. Upon determining that the target tracks correspond to the same target, the data fusion unit 5 combines these target tracks. A thus obtained combined track is externally output.

FIG. 10A is a flowchart showing an exemplary processing procedure of the passive sensor processing unit 2 shown in FIG. 9. FIG. 10B is a flowchart showing an exemplary processing procedure of the data fusion unit 5 shown in FIG. 9.

Referring to FIG. 10A, when processing starts, a measurement data is input to the passive sensor processing unit 2 (ST101). That is, the passive sensor 1 measures the target based on the control signal from the passive sensor processing unit 2, and sends the passive measurement of the target obtained by the measurement to the passive sensor processing unit 2. The passive sensor processing unit 2 acquires the passive measurement sent from the passive sensor 1.

Prediction processing is executed (ST102). That is, the passive sensor processing unit 2 calculates the predicted state of the target and its covariance matrix based on the updated state of the target and its covariance matrix calculated in step ST103 of the preceding measurement.

Update processing is then executed (ST103). That is, based on the passive measurement from the passive sensor 1 and the predicted state of the target and its covariance matrix calculated in step ST102, the passive sensor processing unit 2 calculates the updated state of the target and its covariance matrix and outputs them as the target track.

Control processing is executed (ST104). That is, based on the target track, the passive sensor processing unit 2 generates a control signal to control the posture and the like of the passive sensor 1, and sends the signal to the passive sensor 1. The processing of steps ST101 to ST105 is continued until the end.

Referring to FIG. 10B, when processing starts, track is input to the data fusion unit 5 (ST201). That is, the target track from the passive sensor processing unit 2 and the target track from the active sensor processing unit 4 are input to the data fusion unit 5.

Data fusion processing is executed (ST202). That is, the data fusion unit 5 combines the target track from the passive sensor processing unit 2 and the target track from the active sensor processing unit 4. The obtained combined track is externally output. Details of the data fusion processing will be described later. The processing of steps ST201 to ST203 is continued until the end.

The processing contents of the passive sensor processing unit 2 will be described in detail. The motion model of the target is defined in the following way. Note that "bar x" will be expressed as "x(-)" hereinafter.

$$\bar{x}_{k+1} = F_{k+1}\bar{x}_k + G_{k+1}w_k \quad (1)$$

$$\bar{x}_k = [\, a_k \quad e_k \quad \dot{a}_k \quad \dot{e}_k \,] \quad (2)$$

$$F_{k+1} = \begin{bmatrix} I_2 & (t_{k+1}-t_k)\cdot I_2 \\ O_2 & I_2 \end{bmatrix} \quad (3)$$

$$G_{k+1} = \begin{bmatrix} \frac{(t_{k+1}-t_k)^2}{2}\cdot I_2 \\ (t_{k+1}-t_k)\cdot I_2 \end{bmatrix} \quad (4)$$

$$Q_k = \frac{1}{r_k}\begin{bmatrix} (\sigma_k^h)^2 & 0 \\ 0 & (\sigma_k^v)^2 \end{bmatrix} \quad (5)$$

where $x(-)_k$ is a state vector including an azimuth $a_k$, an elevation $e_k$, and their velocity components at a measurement time $t_k$, $F_{k+1}$ and $G_{k+1}$ are the transition matrix and the driving matrix from the measurement time $t_k$ to a measurement time $t_{k+1}$, respectively, $w_k$ is the process noise vector at the measurement time $t_k$ for an average 0 and a covariance matrix $Q_k$, $\sigma_k^h$ and $\sigma_k^v$ are the standard deviations of the horizontal and vertical planes of process noise at the measurement time $t_k$, respectively, $r_k$ is the distance from the passive sensor 1 to the target at the measurement time $t_k$, $A^T$ is the transposition of a vector or matrix A, $I_n$ is an n×n identity matrix, and $O_n$ is an n×n zero matrix.

The measurement model of the passive sensor 1 is defined by $$y_k = H_k \bar{x}_k + v_k \quad (6)$$

$$H_k = \begin{bmatrix} 1 & 0 & 0 & 0 \\ 0 & 1 & 0 & 0 \end{bmatrix} \quad (7)$$

$$R_k = \begin{bmatrix} (\sigma_k^a)^2 & 0 \\ 0 & (\sigma_k^e)^2 \end{bmatrix} \quad (8)$$

where $y_k$ is the measurement vector of the passive sensor 1 at the measurement time $t_k$, $H_k$ is the measurement matrix of the passive sensor 1 at the measurement time $t_k$, $v_k$ is the measurement noise vector of the passive sensor 1 at the measurement time $t_k$ for an average 0 and a covariance matrix $R_k$, and $\sigma_k^a$ and $\sigma_k^e$ are the standard deviations of the azimuth and elevation of measurement noise at the measurement time $t_k$, respectively.

In step ST101, the passive measurement from the passive sensor 1 is input as the measurement vector $y_k$.

In step ST102, prediction processing represented by the following equations is executed using the result of update processing of the preceding measurement. Note that "hat x" will be expressed as "x(^)" hereinafter.

$$\hat{x}_{k|k-1} = F_k \hat{x}_{k-1|k-1} \quad (9)$$

$$P_{k|k-1} = F_k P_{k-1|k-1} (F_k)^T + G_k Q_{k-1} (G_k)^T \quad (10)$$

$$Q_{k-1} = \frac{1}{r_{preset}} \begin{bmatrix} (\sigma_{k-1}^h)^2 & 0 \\ 0 & (\sigma_{k-1}^v)^2 \end{bmatrix} \quad (11)$$

where $x(\hat{})_{k|k-1}$ and $P_{k|k-1}$ are the predicted state vector and the predicted error covariance matrix at the measurement time $t_k$, respectively, and $x(\hat{})_{k-1|k-1}$ and $P_{k-1|k-1}$ are the updated state vector (i.e. the smoothing vector) and the updated error covariance matrix at a measurement time $t_{k-1}$, respectively. Since a true value $r_{k-1}$ of the target distance cannot be known, a preset target distance $r_{preset}$ is used when calculating a process noise covariance matrix $Q_{k-1}$.

In step ST103, update processing represented by the following equations is executed using the measurement vector from the passive sensor 1 and the result of prediction processing. Note that "tilde y" will be expressed as "y(~)" hereinafter.

$$\tilde{y}_k = y_k - H_k \hat{x}_{k|k-1} \quad (12)$$

$$S_k = H_k P_{k|k-1} (H_k)^T + R_k \quad (13)$$

$$K_k = P_{k|k-1} (H_k)^T (S_k)^{-1} \quad (14)$$

$$\hat{x}_{k|k} = \hat{x}_{k|k-1} + K_k \tilde{y}_k \quad (15)$$

$$P_{k|k} = (I_4 - K_k H_k) P_{k|k-1} \quad (16)$$

where $y(\sim)_k$ is the residual vector of the passive sensor 1 at the measurement time $t_k$, $S_k$ is the residual covariance matrix of the passive sensor 1 at the measurement time $t_k$, $K_k$ is the Kalman gain matrix of the passive sensor 1 at the measurement time $t_k$, $x(\hat{})_{k|k}$ and $P_{k|k}$ are the updated state vector and the updated error covariance matrix at the measurement time $t_k$, respectively, and $A^{-1}$ is the inverse matrix of the matrix A.

In step ST104, control processing is executed. In step ST105, terminate determination processing is executed. Details of data fusion processing of step ST202 will be explained next.

FIG. 11 is a flowchart illustrating details of data fusion processing in FIG. 10B. Referring to FIG. 11, when data fusion processing starts, the correlation processing is performed (ST301). That is, the data fusion unit 5 determines whether the target track from the passive sensor processing unit 2 and that from the active sensor processing unit 4 are of the same target.

Combined track calculation processing is then performed (ST302). That is, upon determining in step ST301 that the target track from the passive sensor processing unit 2 and the target track from the active sensor processing unit 4 are of the same target, the data fusion unit 5 combines the two target track. New data obtained by combining them is externally output as the combined track.

In the tracking processing of the passive sensor 1, the process noise covariance matrix $Q_{k-1}$ includes an error because the distance data from the passive sensor 1 to the target is not available. It is consequently difficult to calculate the optimum value of the filter gain (Kalman gain matrix) that is indirectly calculated from the process noise covariance matrix and used to calculate the track. Hence, the track error of the target becomes large.

If the error of track calculated by the passive sensor processing unit 2 is large, the track error of the combined track calculated by the data fusion unit 5 is also large. This is because the combined track is calculated based on the target track from the passive sensor processing unit 2 and that from the active sensor processing unit 4.

Even for a target that performs constant velocity (non-maneuver) on the orthogonal coordinate system, an angular acceleration and the differential component of the angular acceleration are generated on the polar coordinate system. Since it is difficult to estimate the component from target angle and reflect it on the process noise covariance matrix $Q_{k-1}$, the track error becomes large.

As a technique of improving the tracking performance for both a target that performs non-maneuver and a target that performs maneuver, an Interacting Multiple Model (IMM) filter is known, which operates a plurality of motion models in parallel. The IMM filter is applicable to the processing of the active sensor processing unit 4. However, since many motion models are generally defined as a motion on a three-dimensional orthogonal coordinate system, it is difficult to apply the technique to the passive sensor processing unit 2 that estimates the target track on a two-dimensional polar coordinate system or the like.

As described above, in the target tracking device using a passive sensor, the distance data from the passive sensor 1 to the target is not obtained in general. It is therefore difficult to calculate the optimum value of the filter gain to be used to calculate the track, and the track error becomes large.

Since the distance data to the target cannot be obtained, the target is tracked on a local coordinate system about the passive sensor. However, when, for example, a polar coordinate system is used as the local coordinate system, an angular acceleration and the differential component of the angular acceleration are generated on the polar coordinate system even if the target performs constant velocity (non-maneuver) on the orthogonal coordinate system.

When the filter gain is increased to cope with the above-described problem, the random component of the track error becomes large. When the filter gain is decreased to make the random component of the track error smaller, the bias component of the track error becomes large. At any rate, it is difficult to improve the tracking performance. Even performing data fusion using track calculated by the passive sensor processing unit does not allow to improve the accuracy of the combined track. That is, the target tracking device using both the passive sensor and the active sensor needs to reduce the error caused by the passive sensor because it affects the total performance.

When a technique assuming a single motion model is optimized for a target that performs non-maneuver, tracking performance for a target that performs maneuver degrades. Similarly, when the technique is optimized for a target that performs maneuver, tracking performance for a target that performs non-maneuver degrades. That is, it is difficult for the existing technique to improve the tracking performance for both a target that performs non-maneuver and a target that performs maneuver.

BRIEF DESCRIPTION OF THE DRAWINGS

FIG. 1 shows an exemplary block diagram of a target tracking device according to the first embodiment;

FIGS. 5A and 5B are flowcharts illustrating the procedure of target tracking processing performed by a target tracking device according to the fourth embodiment;

FIG. 7 is a block diagram showing the arrangement of a target tracking device according to a modification of the first to fifth embodiments;

FIG. 10A is a flowchart showing an exemplary processing procedure of the passive sensor processing unit 2 shown in FIG. 9;

FIG. 10B is a flowchart showing an exemplary processing procedure of the data fusion unit 5 shown in FIG. 9.

DETAILED DESCRIPTION

In general, according to one embodiment, a target tracking device includes a passive sensor processing unit, an active sensor processing unit, a data fusion unit and a correction unit. The passive sensor processing unit calculates passive track of a target based on passive measurement of the target angle measured by a passive sensor. The active sensor processing unit calculates active track of the target based on active measurement of the target distance and angle measured by an active sensor. The data fusion unit combines the passive track and the active track and outputs a combined track when the passive track and the active track are from same target. The correction unit calculates correction data based on the combined track. The passive sensor processing unit calculates track of the target for each of a plurality of motion models based on the passive measurement of the target angle and the correction data. The passive sensor processing unit calculates the passive track by weighted sum of all tracks for the motion models.

Passive track is the track of the target. Passive track is calculated based on passive measurement of the target angle measured by a passive sensor. In specification, active track is also considered.

Active track is the track of the target, too. Active track is calculated based on active measurement of the target distance and angle measured by an active sensor.

Figure 9:
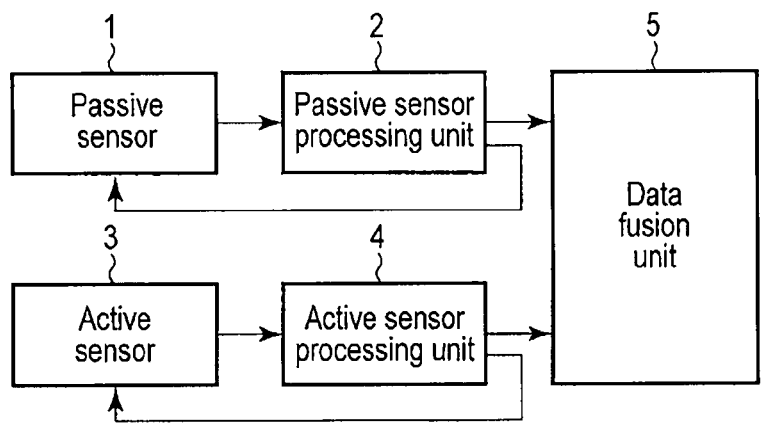
FIG. 9 shows a block diagram illustrating an example of the arrangement of a conventional target tracking device.

The target tracking device according to an embodiment will now be described in detail with reference to the accompanying drawings. The same reference numerals as in FIG. 9 denote the common blocks in the following explanation. The common processing steps are indicated by the same step numbers in the flowcharts.

First Embodiment

FIG. 1 is a block diagram showing an example of a target tracking device according to the first embodiment. The target tracking device shown in FIG. 1 comprises a passive sensor 1, a passive sensor processing unit 2a, an active sensor 3, an active sensor processing unit 4, a data fusion unit 5, and a correction data calculation unit 6a. The active sensor 3 and the active sensor processing unit 4 are external devices.

The passive sensor 1 passively measures the angle of a target and sends the obtained passive measurement to the passive sensor processing unit 2a.

Based on the passive measurement from the passive sensor 1 and the correction data (target distance) from the correction data calculation unit 6a, the passive sensor processing unit 2a calculates a predicted state for each of a plurality of motion models and an updated state for each of the plurality of motion models. The passive sensor processing unit 2a also calculates an updated state by weighted sum of the updated states for the plurality of motion models, and sends the updated state to the data fusion unit 5 as the target track. Based on the target track, the passive sensor processing unit 2a generates a control signal to control the posture and the like of the passive sensor 1 and sends the signal to the passive sensor 1.

The active sensor 3 measures the distance and angle of arrival of the echo (electromagnetic wave or sound wave) of an electromagnetic wave or a sound wave radiated by the active sensor 3 itself. A thus obtained measurement data is sent to the active sensor processing unit 4 as active measurement of the target distance and angle.

The active sensor processing unit 4 calculates a predicted state and an updated state based on the measurement data from the active sensor 3. The calculated predicted state and updated state are sent to the data fusion unit 5 as the target track. Based on the target track, the active sensor processing unit 4 generates a control signal to control the posture and the like of the active sensor 3 and sends the signal to the active sensor 3.

When the target track from the passive sensor processing unit 2a and the target track from the active sensor processing unit 4 are from same target, the data fusion unit 5 combines these target track. The combined track obtained by the combining processing is sent to the correction data calculation unit 6a.

The correction data calculation unit 6a calculates the target distance (distance from the passive sensor 1 to the target) based on the combined track sent from the data fusion unit 5. The correction data calculation unit 6a sends the calculated target distance to the passive sensor processing unit 2a as correction data. The functions of the target tracking device according to the first embodiment will be described next.

Figure 2A:
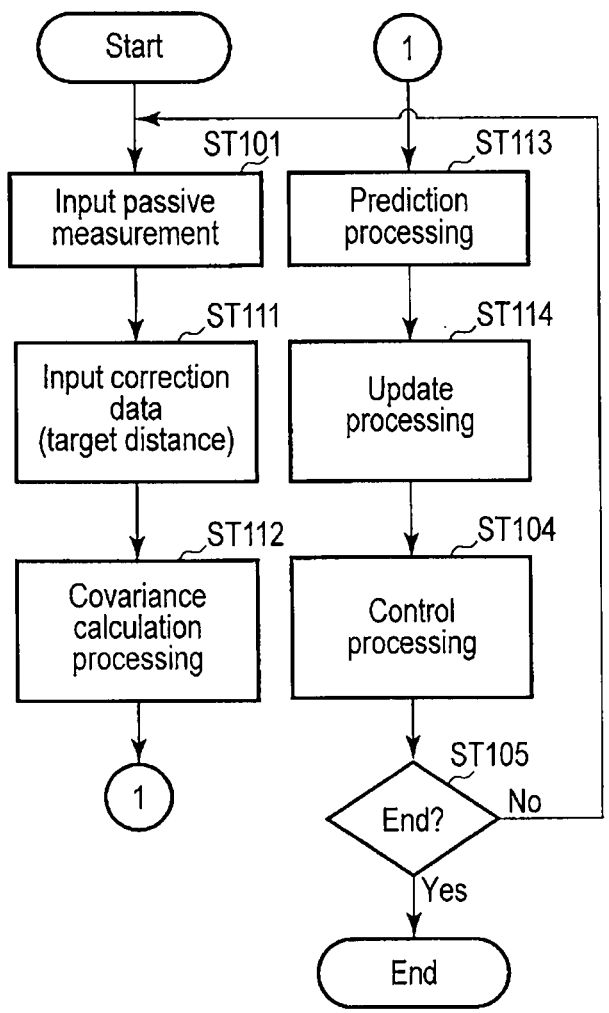
FIGS. 2A and 2B are flowcharts illustrating the procedure of target tracking processing performed by the target tracking device according to the first embodiment.

FIG. 2A is a flowchart illustrating the first example of the processing procedure of the passive sensor processing unit 2a shown in FIG. 1. FIG. 26 is a flowchart illustrating the first example of the processing procedure of the data fusion unit 5 and the correction data calculation unit 6a shown in FIG. 1.

Referring to FIG. 2A, the measurement data is input to the passive sensor processing unit 2a (ST101). That is, the passive sensor 1 measures the target based on the control signal from the passive sensor processing unit 2a. The passive sensor processing unit 2a acquires the passive measurement sent from the passive sensor 1.

Correction data input processing (target distance) is executed (ST111). That is, the passive sensor processing unit 2a acquires the correction data (target distance) from the correction data calculation unit 6a.

Covariance calculation processing is executed (ST112). That is, the passive sensor processing unit 2a calculates a process noise covariance matrix for each of the plurality of motion models based on the correction data (target distance) from the correction data calculation unit 6a.

Prediction processing is executed (ST113). That is, the passive sensor processing unit 2a calculates the predicted state of the target and its covariance matrix for each of the plurality of motion models based on the updated states of the target and their covariance matrices for the plurality of motion models and the process noise covariance matrices for the plurality of motion models.

The updated states of the target and their covariance matrices for the plurality of motion models are calculated in step ST114 of the preceding measurement. The process noise covariance matrices for the plurality of motion models are calculated in step ST112.

Update processing is then executed (ST114). That is, based on the passive measurement from the passive sensor 1 and the predicted states of the target and their covariance matrices for the plurality of motion models, the passive sensor processing unit 2a calculates the updated state of the target and its covariance matrix for each of the plurality of motion models.

The passive sensor processing unit 2a also calculates the updated state of the target and its covariance matrix by weighted sum of the updated states of the target and their covariance matrices for the plurality of motion models. The calculated updated state and its covariance matrix are output as the target track. The predicted states of the target and their covariance matrices for the plurality of motion models are calculated in step ST113.

Control processing is executed (ST104). That is, based on the target track, the passive sensor processing unit 2a generates a control signal to control the posture and the like of the passive sensor 1, and sends the signal to the passive sensor 1. It is then checked whether to end (ST105). Upon determining in step ST105 not to end, the process returns to step ST101 to repeat the above-described processing. On the other hand, upon determining in step ST105 to end, the target tracking processing ends.

Figure 2B:
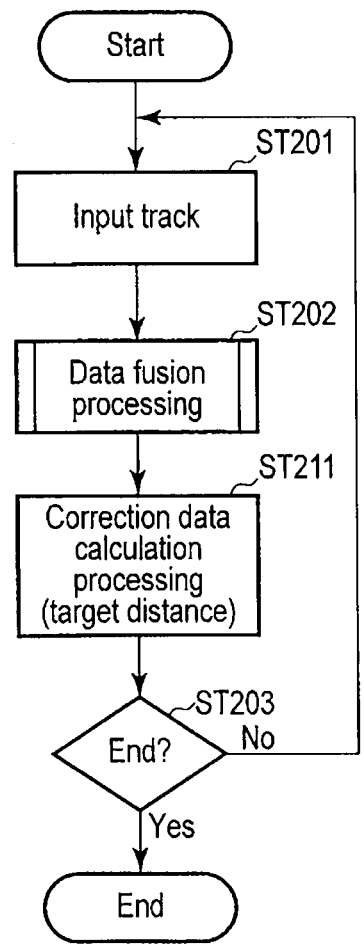

Referring to FIG. 2B, the track is input to the data fusion unit 5 (ST201). That is, the data fusion unit 5 acquires the target track from the passive sensor processing unit 2a and that from the active sensor processing unit 4.

Figure 11:
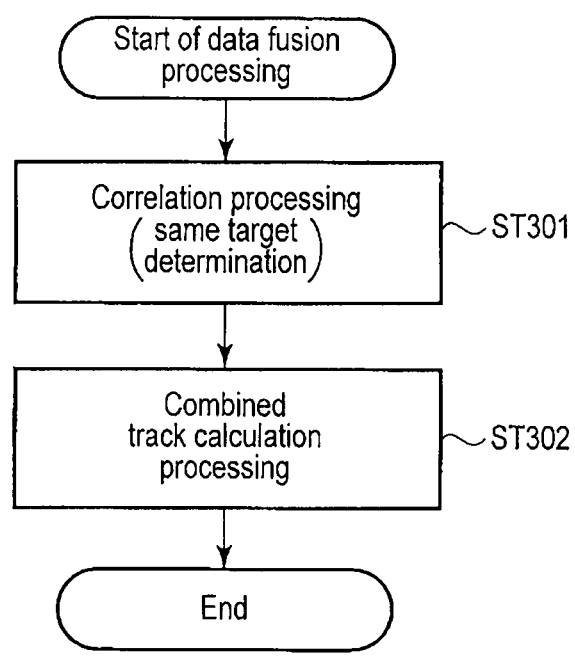
FIG. 11 shows a flowchart illustrating details of data fusion processing in FIG. 10B.

Data fusion processing is executed (ST202). That is, the data fusion unit 5 combines the target track from the passive sensor processing unit 2a and that from the active sensor processing unit 4 in accordance with the procedure shown in, for example, FIG. 11. The generated combined track is sent to the correction data calculation unit 6a.

Correction data calculation processing (target distance) is executed (ST211). That is, the correction data calculation unit 6a calculates the distance data from the passive sensor 1 to the target based on the combined track from the data fusion unit 5. The correction data calculation unit 6a calculates correction data (target distance) based on the distance data and the passive measurement from the passive sensor 1. The calculated correction data (target distance) is sent to the passive sensor processing unit 2a. The processing of steps ST201, ST202, ST211, and ST203 is repeated until the end.

In the following explanation, the correction data is used to perform correction when calculating the target track based on the passive measurement from the passive sensor 1.

The processing contents of the correction data calculation unit 6a and the passive sensor processing unit 2a will be described next in detail. The motion model of the target is defined by $$x^i_{k+1} = F_{k+1} x^i_k + G_{k+1} w^i_k \qquad (17)$$

$$x^i_k = [\, a^i_k \quad e^i_k \quad \dot{a}^i_k \quad \dot{e}^i_k \,]^T \qquad (18)$$

$$F_{k+1} = \begin{bmatrix} I_2 & (t_{k+1} - t_k) \cdot I_2 \\ O_2 & I_2 \end{bmatrix} \qquad (19)$$

$$G_{k+1} = \begin{bmatrix} \dfrac{(t_{k+1} - t_k)^2}{2} \cdot I_2 \\ (t_{k+1} - t_k) \cdot I_2 \end{bmatrix} \qquad (20)$$

$$Q^i_k = \dfrac{1}{r_k} \begin{bmatrix} (\sigma^{h,i}_k)^2 & 0 \\ 0 & (\sigma^{v,i}_k)^2 \end{bmatrix} \qquad (21)$$

where $x^i_k$ is a state vector corresponding to the ith motion model and including an azimuth $a^i_k$, an elevation $e^i_k$, and their velocity components at a measurement time $t_k$, $F_{k+1}$ and $G_{k+1}$ are the transition matrix and the driving matrix from the measurement time $t_k$ to a measurement time $t_{k+1}$, respectively, $w^i_k$ is the process noise vector corresponding to the ith motion model at the measurement time $t_k$ for an average 0 and a covariance matrix $Q^i_k$, $\sigma^{h,i}_k$ and $\sigma^{v,i}_k$ are the standard deviations of the horizontal and vertical planes of process noise corresponding to the ith motion model at the measurement time $t_k$, respectively, $r_k$ is the distance from the passive sensor 1 to the target at the measurement time $t_k$, $A^T$ is the transposition of a vector or matrix A, $I_n$ is an n×n identity matrix, and $O_n$ is an n×n zero matrix.

The measurement model of the passive sensor 1 is defined by $$y_k = H_k x^i_k + v_k \qquad (22)$$

$$H_k = \begin{bmatrix} 1 & 0 & 0 & 0 \\ 0 & 1 & 0 & 0 \end{bmatrix} \qquad (23)$$

-continued $$R_k = \begin{bmatrix} (\sigma_k^a)^2 & 0 \\ 0 & (\sigma_k^e)^2 \end{bmatrix} \quad (24)$$

where $y_k$ is the measurement vector of the passive sensor 1 at the measurement time $t_k$, $x^t_k$ is the true state vector at the measurement time $t_k$, $H_k$ is the measurement matrix of the passive sensor 1 at the measurement time $t_k$, $v_k$ is the measurement noise vector of the passive sensor 1 at the measurement time $t_k$ for an average 0 and a covariance matrix $R_k$, and $\sigma^a_k$ and $\sigma^e_k$ are the standard deviations of the azimuth and elevation of measurement noise at the measurement time $t_k$, respectively.

In step ST101, the passive measurement from the passive sensor 1 is input to the passive sensor processing unit 2a as the measurement vector $y_k$.

In step ST111, the correction data calculation unit 6a calculates the target distance $r(\hat{})_{k-1}$ calculated in step ST211. Note that the target distance $r(\hat{})_{k-1}$ is calculated based on the combined track by $$\hat{r}_{k-1} = \sqrt{(x_{k-1}-x_0)^2 + (y_{k-1}-y_0)^2 + (z_{k-1}-z_0)^2} \quad (25)$$

where $x_{k-1}$, $y_{k-1}$, and $z_{k-1}$ are x-, y-, and z-components at the position of the combined track of the target at a measurement time $t_{k-1}$, and $x_0$, $y_0$, and $z_0$ are x-, y-, and z-components at the position of the passive sensor 1.

Note that a radar device or the like is usable as the external devices (the active sensor 3 and the active sensor processing unit 4). The target distance may be directly measured using a distance measurement device such as a laser ranging device arranged at almost the same position as the passive sensor 1.

In step ST112, the passive sensor processing unit 2a calculates a process noise covariance matrix $Q^i_{k-1}$ corresponding to the ith motion model based on the correction data (target distance) from the correction data calculation unit 6a by $$Q^i_{k-1} = \frac{1}{\hat{r}_{k-1}} \begin{bmatrix} (\sigma^{h,i}_{k-1})^2 & 0 \\ 0 & (\sigma^{v,i}_{k-1})^2 \end{bmatrix} \quad (26)$$

In step ST113, the passive sensor processing unit 2a executes, using the result of update processing of the preceding measurement and the process noise covariance matrix $Q^i_{k-1}$ corresponding to the ith motion model obtained by equation (26) in step ST112, prediction processing represented by $$\hat{x}^i_{k|k-1} = F_k \hat{x}^i_{k-1|k-1} \quad (27)$$

$$P^i_{k|k-1} = F_k P^i_{k-1|k-1} (F_k)^T + G_k G^i_{k-1} (G_k)^T \quad (28)$$

where $x(\hat{})^i_{k|k-1}$ and $P^i_{k|k-1}$ are the predicted state vector and the predicted error covariance matrix corresponding to the ith motion model at the measurement time $t_k$, respectively, and $x(\hat{})^i_{k-1|k-1}$ and $P^i_{k-1|k-1}$ are the updated state vector and the updated error covariance matrix corresponding to the ith motion model at the measurement time $t_{k-1}$, respectively.

In step ST114, the passive sensor processing unit 2a executes, using the measurement vector from the passive sensor 1 and the result of prediction processing, update processing represented by $$\tilde{y}^i_k = y_k - H_k \hat{x}^i_{k|k-1} \quad (29)$$

$$S^i_k = H_k P^i_{k|k-1} (H_k)^T + R_k \quad (30)$$

$$K^i_k = P^i_{k|k-1} (H_k)^T (S^i_k)^{-1} \quad (31)$$

$$\hat{x}^i_{k|k} = \hat{x}^i_{k|k-1} + K^i_k \tilde{y}^i_k \quad (32)$$

$$P^i_{k|k} = (I_4 - K^i_k K_k) P^i_{k|k-1} \quad (33)$$

$$p^i_k = \frac{l^i_k p^i_{k-1}}{\sum_{j=1}^{n} l^j_k p^j_k \ldots 1} \quad (34)$$

$$\hat{x}_{k|k} = \sum_{i=1}^{n} p^i_k \hat{x}^i_{k|k} \quad (35)$$

$$P_{k|k} = \sum_{i=1}^{n} p^i_k \left( P^i_{k|k} + (\hat{x}^i_{k|k} - \hat{x}_{k|k})(\hat{x}^i_{k|k} - \hat{x}_{k|k})^T \right) \quad (36)$$

where $y(\sim)^i_k$ is the residual vector of the passive sensor 1 corresponding to the ith motion model at the measurement time $t_k$, $S^i_k$ is the residual covariance matrix of the passive sensor 1 corresponding to the ith motion model at the measurement time $t_k$, $K^i_k$ is the Kalman gain matrix of the passive sensor 1 corresponding to the ith motion model at the measurement time $t_k$, $x(\hat{})^i_{k|k}$ and $P^i_{k|k}$ are the updated state vector and the updated error covariance matrix corresponding to the ith motion model at the measurement time $t_k$, respectively, $p^i_k$ is the motion model probability corresponding to the ith motion model at the measurement time $t_k$, $l^i_k$ us the motion model likelihood corresponding to the ith motion model at the measurement time $t_k$, $x(\hat{})_{k|k}$ and $P_{k|k}$ are the updated state vector and updated error are the updated state vector and updated error covariance matrix at the measurement time $t_k$ which are obtained by weighted sum of the plurality of motion models, and $A^{-1}$ is the inverse matrix of the matrix A.

In step ST104, control processing is executed. In step ST105, terminate determination processing is executed.

As described above, according to the target tracking device of the first embodiment, the correction data calculation unit 6a calculates correction data (target distance) based on the combined track output from the data fusion unit 5. The passive sensor processing unit 2a calculates correction data for each of the plurality of motion models based on the correction data (target distance) from the correction data calculation unit 6a. The passive sensor processing unit 2a uses, for track calculation, a filter gain (Kalman gain matrix) indirectly calculated from the correction data for each of the plurality of motion models. It is therefore possible to reduce the track error (random component) of a target that performs non-maneuver and the track error (bias component) of a target that performs maneuver. This allows to reduce the track error of the combined track calculated by the data fusion unit 5.

Note that although in the above description, a constant velocity model is used as the motion model of the target, the above-described processing is also applicable to another motion model such as a constant acceleration model. The passive sensor processing unit 2a may execute IMM filter processing or the like.

In the above-described example, the state vector of the target of the passive sensor processing unit 2a is represented on the polar coordinate system. Instead, the position (the horizontal and vertical coordinates and the velocity) of the target on a camera image or the like may be used.

In the target tracking device according to the first embodiment, the correction data calculation unit 6a calculates the target distance as the correction data. The passive sensor processing unit 2a calculates the process noise covariance matrix for each of the plurality of motion models based on the correction data (target distance). Instead, the correction data calculation unit 6a may calculate the process noise covariance matrix for each of the plurality of motion models as the correction data. The passive sensor processing unit 2a may calculate the filter gain based on the correction data (process noise covariance matrix for each of the plurality of motion models).

Second Embodiment

In a target tracking device according to the second embodiment, the functions of the correction data calculation unit 6a and the passive sensor processing unit 2a shown in FIG. 1 are slightly different from those of the first embodiment. In the second embodiment, reference numeral 6b denotes a correction data calculation unit; and 2b, a passive sensor processing unit. Only parts different from the target tracking device according to the first embodiment will be explained below.

The correction data calculation unit 6b calculates correction data based on a combined track sent from a data fusion unit 5 and a target track output from an active sensor processing unit 4. In the second embodiment, a target track (includes a process noise covariance matrix) output from active sensor processing unit 4 corresponds to the combined track. In the second embodiment, the target distance (distance from a passive sensor 1 to the target) and the process noise covariance matrix of the target are used as the correction data.

Based on passive measurement from the passive sensor 1 and the correction data (target distance and process noise covariance matrix) from the correction data calculation unit 6b, the passive sensor processing unit 2b calculates a predicted state for each of a plurality of motion models and an updated state for each of the plurality of motion models. The passive sensor processing unit 2b also calculates an updated state by weighted sum of the updated states for the plurality of motion models, and sends the updated state to the data fusion unit 5 as the target track. The functions of the target tracking device according to the second embodiment will be described next.

Figures 3A, 3B:
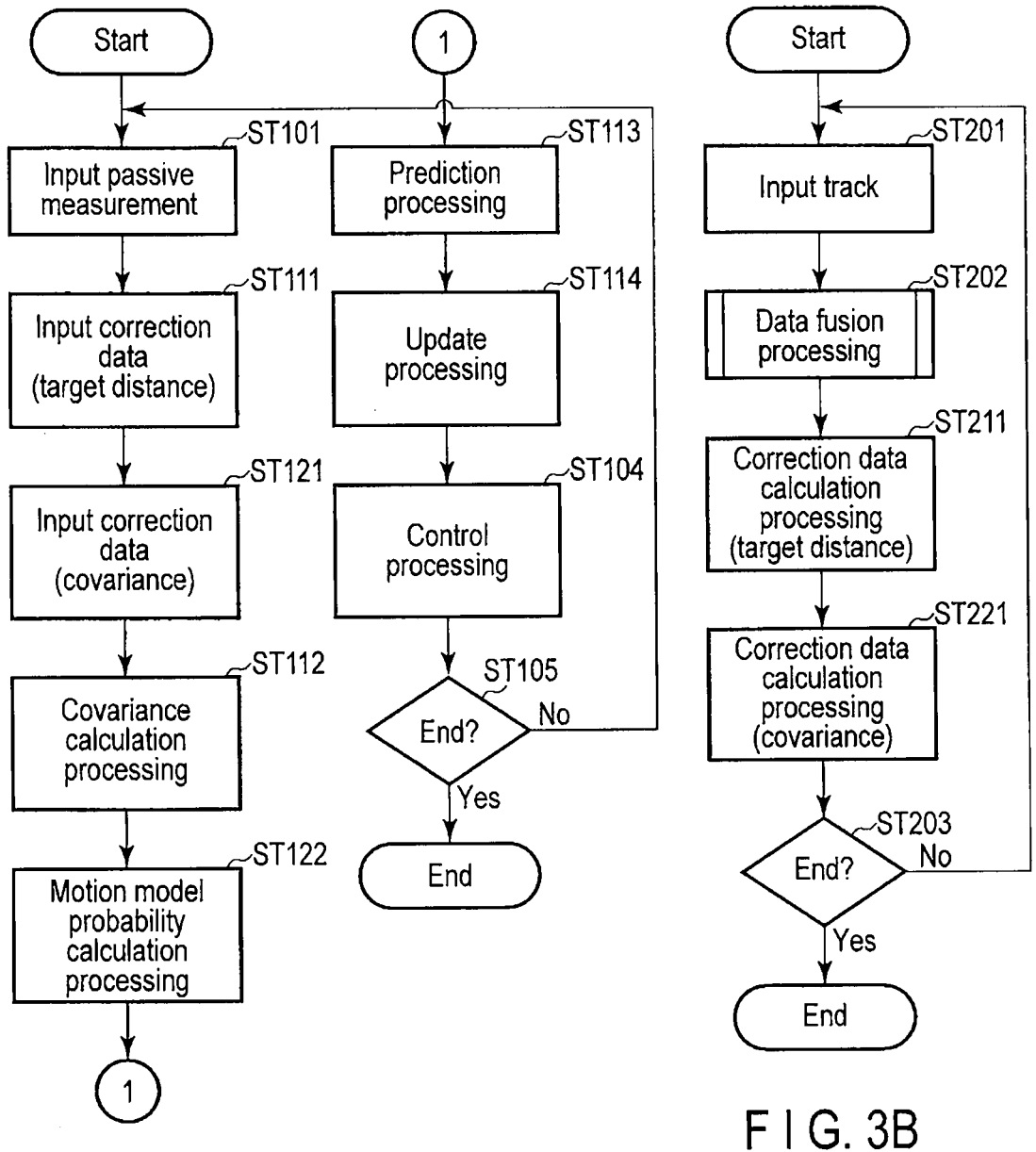
FIGS. 3A and 3B are flowcharts illustrating the procedure of target tracking processing performed by a target tracking device according to the second embodiment.

FIG. 3A is a flowchart illustrating the procedure executed by the passive sensor processing unit 2b of the target tracking device according to the second embodiment. FIG. 3B is a flowchart illustrating the procedure executed by the data fusion unit 5 and the correction data calculation unit 6b of the target tracking device according to the second embodiment.

When tracking processing starts, passive measurement is input (ST101). That is, the passive sensor 1 measures the target based on a control signal from the passive sensor processing unit 2b, and sends the passive measurement to the passive sensor processing unit 2b. The passive sensor processing unit 2b acquires the passive measurement sent from the passive sensor 1.

Correction data input processing (target distance) is executed (ST111). That is, the passive sensor processing unit 2b acquires the correction data (target distance) from the correction data calculation unit 6b.

Correction data input processing (covariance) is executed (ST121). That is, the passive sensor processing unit 2b acquires the correction data (process noise covariance matrix) from the correction data calculation unit 6b.

Covariance calculation processing is executed (ST112). That is, the passive sensor processing unit 2b calculates a process noise covariance matrix for each of the plurality of motion models based on the correction data (target distance) from the correction data calculation unit 6b.

Motion model probability calculation processing is then executed (ST122). That is, the passive sensor processing unit 2b calculates a motion model probability for each of the plurality of motion models based on the correction data (process noise covariance matrix) from the correction data calculation unit 6b.

Prediction processing is executed (ST113). That is, the passive sensor processing unit 2b calculates the predicted state of the target and its covariance matrix for each of the plurality of motion models based on the updated states of the target and their covariance matrices for the plurality of motion models and the process noise covariance matrices for the plurality of motion models. The updated states of the target and their covariance matrices for the plurality of motion models are calculated in step ST114 of the preceding measurement. The process noise covariance matrices for the plurality of motion models are calculated in step ST112.

Update processing is then executed (ST114). That is, based on the passive measurement from the passive sensor 1 and the predicted states of the target and their covariance matrices for the plurality of motion models, the passive sensor processing unit 2b calculates the updated state of the target and its covariance matrix for each of the plurality of motion models. The predicted states of the target and their covariance matrices for the plurality of motion models are calculated in step ST113.

The passive sensor processing unit 2b also calculates the updated state of the target and its covariance matrix by weighted sum of the updated states of the target and their covariance matrix. These values are sent to the data fusion unit 5 as the target track.

Control processing is executed (ST104). That is, based on the target track, the passive sensor processing unit 2b generates a control signal to control the posture and the like of the passive sensor 1. The control signal is sent to the passive sensor 1. The processing of steps ST101 to ST105 is continued until the end.

The processing contents of the data fusion unit 5 and the correction data calculation unit 6b will be described next in detail with reference to FIG. 3B. First, the track is input to the data fusion unit 5 (ST201). That is, the data fusion unit 5 acquires the target track from the passive sensor processing unit 2b and that from the active sensor processing unit 4.

Data fusion processing is executed (ST202). That is, the data fusion unit 5 combines the target track from the passive sensor processing unit 2b and that from the active sensor processing unit 4. The obtained combined track is sent to the correction data calculation unit 6b.

Correction data calculation processing (target distance) is executed (ST211). That is, the correction data calculation unit 6b calculates the distance from the passive sensor 1 to the target based on the combined track from the data fusion unit 5. The calculated value is sent to the passive sensor processing unit 2b as the correction data (target distance).

Correction data calculation processing (covariance) is executed (ST221). That is, the correction data calculation unit 6b calculates the process noise covariance matrix of the target based on the combined track from the data fusion unit 5 and the target track output from the active sensor processing unit 4. The process noise covariance matrix is sent to the passive sensor processing unit 2b as the correction data (process noise covariance matrix). The process noise covariance matrix output from the active sensor processing unit 4 corresponds to the combined track.

Note that as the external devices (the active sensor 3 and the active sensor processing unit 4), for example, a radar device including an adaptive Kalman filter or an IMM filter capable of estimating the process noise covariance matrix of the target is usable. The processing of steps ST201 to ST203 is continued until the end.

The processing contents of the correction data calculation unit 6b and the passive sensor processing unit 2b will be described next in detail. The motion model of the target and the measurement model of the passive sensor 1 are the same as in the first embodiment. Referring to FIGS. 3A and 3B, the processing contents of steps ST101, ST111, ST112, ST113, ST104, and ST105 are the same as in the first embodiment.

In step ST121, the process noise covariance matrix calculated in step ST221 is acquired. In step ST211, based on a process noise covariance matrix $Q^a_{k-1}$ and the combined track, a process noise covariance matrix $Q_{k-1}$ viewed from the passive sensor 1 is calculated as correction data. The process noise covariance matrix $Q^a_{k-1}$ is output from the active sensor processing unit 4. The combined track is output from the data fusion unit 5.

$$Q_{k-1} = T_{k-1} Q^a_{k-1} (T_{k-1})^T = \begin{bmatrix} V^{aa}_{k-1} & V^{ae}_{k-1} \\ V^{ae}_{k-1} & V^{ee}_{k-1} \end{bmatrix} \quad (37)$$

When the process noise covariance matrix $Q^a_{k-1}$ output from the active sensor processing unit 4 is given by $$Q^a_{k-1} = \begin{bmatrix} V^{xx}_{k-1} & V^{xy}_{k-1} & V^{xz}_{k-1} \\ V^{xy}_{k-1} & V^{yy}_{k-1} & V^{yz}_{k-1} \\ V^{xz}_{k-1} & V^{yz}_{k-1} & V^{zz}_{k-1} \end{bmatrix} \quad (38)$$

a transformation matrix $T_{k-1}$ is given by $$T_{k-1} = \frac{\partial(a_{k-1}, e_{k-1})}{\partial(x_{k-1}, y_{k-1}, z_{k-1})} = \begin{bmatrix} \frac{\partial a_{k-1}}{\partial x_{k-1}} & \frac{\partial a_{k-1}}{\partial y_{k-1}} & \frac{\partial a_{k-1}}{\partial z_{k-1}} \\ \frac{\partial e_{k-1}}{\partial x_{k-1}} & \frac{\partial e_{k-1}}{\partial y_{k-1}} & \frac{\partial e_{k-1}}{\partial z_{k-1}} \end{bmatrix} \quad (39)$$

Note that $(x_{k-1}, y_{k-1}, z_{k-1})$ and $(a_{k-1}, e_{k-1})$ are values obtained by converting the combined track into the position vector (orthogonal coordinate system and polar coordinate system) of the target viewed from the passive sensor 1.

Note that $(x_{k-1}, y_{k-1}, z_{k-1})$ and $(a_{k-1}, e_{k-1})$ can also be calculated based on the track output from the active sensor processing unit 4.

In step ST122, using the process noise covariance matrix $Q_{k-1}$ and a process noise covariance matrix $Q^i_{k-1}$ corresponding to the ith motion model, the passive sensor processing unit 2b calculates a motion model probability $p^i_{k-1}$ corresponding to the ith motion model and satisfying $$\left. \begin{array}{l} Q_{k-1} \approx \sum_{i=1}^{n} p^i_{k-1} Q^i_{k-1} \\ \sum_{i=1}^{n} p^i_{k-1} = 1 \end{array} \right\} \quad (40)$$

The process noise covariance matrix $Q_{k-1}$ is acquired in step ST121. The process noise covariance matrix $Q^i_{k-1}$ corresponding to the ith motion model is calculated in step ST112.

Note that if the defined (set) motion model does not strictly apply to the actual motion model, the process noise covariance matrix $Q^i_{k-1}$ corresponding to the ith motion model can be corrected in consideration of the error component in modeling.

In step ST114, update processing is executed using the motion model probability $p^i_{k-1}$ corresponding to the ith motion model, which is calculated by equation (40) in step ST122 in place of equation (34) of update processing of the preceding measurement (step ST114).

As described above, according to the target tracking device of the second embodiment, the correction data calculation unit 6b calculates correction data (target distance and process noise covariance matrix) based on the combined track output from the data fusion unit 5. The passive sensor processing unit 2b calculates correction data for each of the plurality of motion models based on the correction data (target distance) from the correction data calculation unit 6b. The passive sensor processing unit 2b uses, for track calculation, a filter gain (Kalman gain matrix) indirectly calculated from the correction data (target distance) sent from the correction data calculation unit 6b for each of the plurality of motion models.

It is therefore possible to reduce the track error (random component) of a target that performs non-maneuver and the track error (bias component) of a target that performs maneuver.

Additionally, the passive sensor processing unit 2b uses, for track calculation, the motion model probability indirectly calculated from the correction data (process noise covariance matrix) for each of the plurality of motion models. This allows to reduce the track error from the passive sensor processing unit 2b for both a target that performs non-maneuver and a target that performs maneuver at initial tracking stage when the number of times of measurement is small. Also, this allows to reduce the track error from the passive sensor processing unit 2b for both the target that performs non-maneuver and the target that performs maneuver even when the motion model of the target has changed after the preceding measurement. Therefore, the track error of the combined track calculated by the data fusion unit 5 is reduced.

Third Embodiment

In a target tracking device according to the third embodiment, the functions of the correction data calculation unit 6a and the passive sensor processing unit 2a shown in FIG. 1 are slightly different from those of the first embodiment. In the third embodiment, reference numeral 6c denotes a correction data calculation unit; and 2c, a passive sensor processing unit. Only parts different from the target tracking device according to the first embodiment will be explained below.

The correction data calculation unit 6c calculates correction data on a local coordinate system (polar coordinate system) about a passive sensor 1 based on a combined track sent from a data fusion unit 5. In the third embodiment, the angular acceleration of the target, which is generated when the constant velocity model on the polar coordinate system defined (set) by equation (17) does not strictly apply to the constant velocity model on the orthogonal coordinate system, is regarded as a control input vector. The correction data is sent to the passive sensor processing unit 2c.

Based on passive measurement from the passive sensor 1 and the correction data (control input vector) from the correction data calculation unit 6c, the passive sensor processing unit 2c calculates a predicted state for each of a plurality of motion models and an updated state for each of the plurality of motion models. The passive sensor processing unit 2c also calculates an updated state by weighted sum of the updated states for the plurality of motion models, and sends the updated state to the data fusion unit 5 as the target track. The passive sensor processing unit 2c generates a control signal to control the posture and the like of the passive sensor 1 based on the target track. The control signal is sent to the passive sensor 1. The functions of the target tracking device according to the third embodiment will be described next.

Figures 4A, 4B:
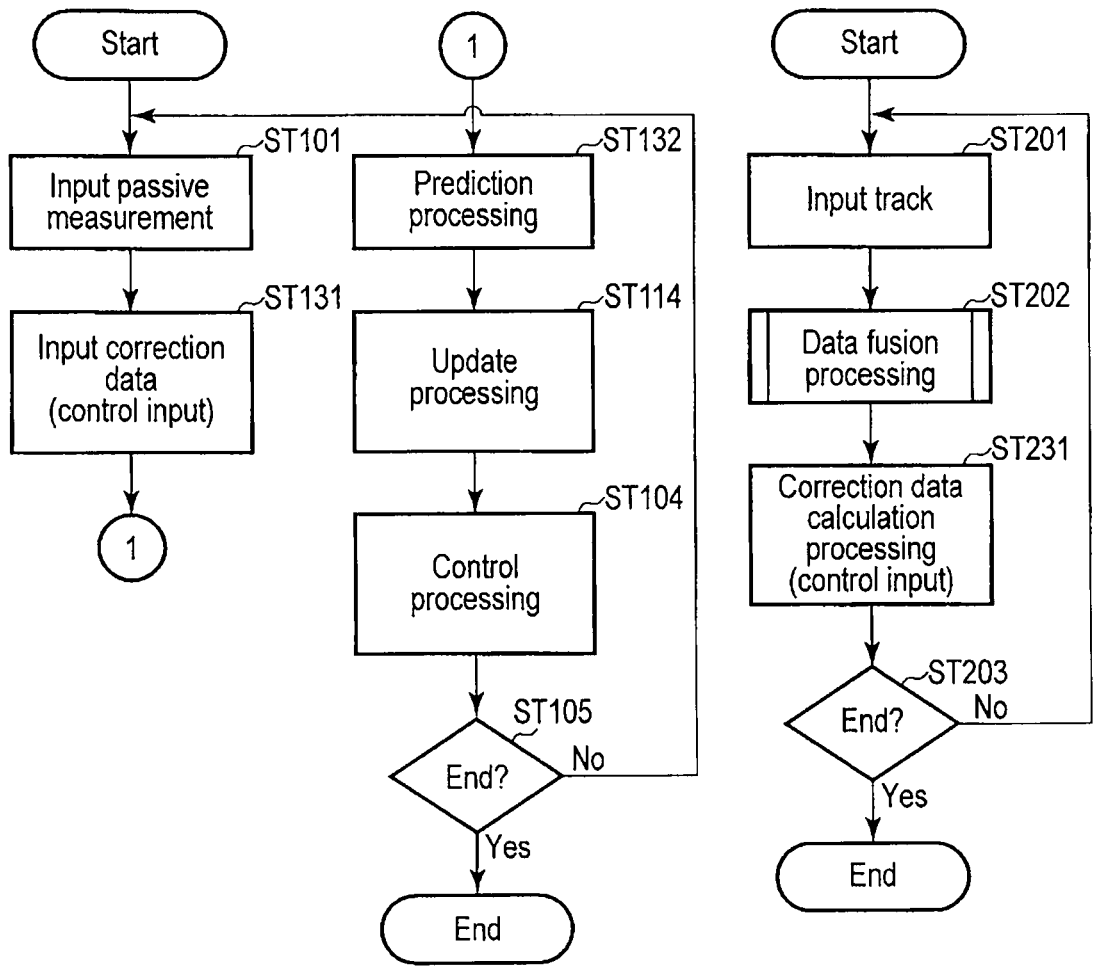
FIGS. 4A and 4B are flowcharts illustrating the procedure of target tracking processing performed by a target tracking device according to the third embodiment.

FIG. 4A is a flowchart illustrating the processing procedure of the passive sensor processing unit 2c according to the third embodiment. FIG. 4B is a flowchart illustrating the processing procedure of the data fusion unit 5 and the correction data calculation unit 6c according to the third embodiment. Note that only processing procedures different from those of the first or second embodiment will be explained below.

Referring to FIG. 4A, when tracking processing starts, passive measurement is input to the passive sensor processing unit 2c (ST101). That is, the passive sensor 1 measures the target based on a control signal from the passive sensor processing unit 2c, and sends the passive measurement to the passive sensor processing unit 2c. The passive sensor processing unit 2c acquires the passive measurement sent from the passive sensor 1.

Correction data input processing (control input) is executed (ST131). That is, the passive sensor processing unit 2c acquires the correction data (control input vector) from the correction data calculation unit 6c.

Prediction processing is executed (ST132). That is, the passive sensor processing unit 2c calculates the predicted state of the target and its covariance matrix for each of the plurality of motion models based on the updated states of the target and their covariance matrices for the plurality of motion models and the correction data (control input vector) from the correction data calculation unit 6c. The updated states of the target and their covariance matrices for the plurality of motion models are calculated in step ST114 of the preceding measurement.

Update processing is then executed (ST114). That is, based on the passive measurement from the passive sensor 1 and the predicted states of the target and their covariance matrices for the plurality of motion models, the passive sensor processing unit 2c calculates the updated state of the target and its covariance matrix for each of the plurality of motion models. The predicted states of the target and their covariance matrices for the plurality of motion models are calculated in step ST132. The passive sensor processing unit 2c also calculates the updated state of the target and its covariance matrix by weighted sum of the updated states of the target and their covariance matrix for the plurality of motion models. The updated state of the target and its covariance matrix are sent to the data fusion unit 5 as the target track.

Control processing is executed (ST104). That is, based on the target track, the passive sensor processing unit 2c generates a control signal to control the posture and the like of the passive sensor 1 and sends the signal to the passive sensor 1. The processing of steps ST101 to ST105 is continued until the end.

Referring to FIG. 4B, the track is input to the data fusion unit 5 (ST201). That is, the data fusion unit 5 acquires the target track from the passive sensor processing unit 2c and that from an active sensor processing unit 4.

Data fusion processing is executed (ST202). That is, the data fusion unit 5 combines the target track from the passive sensor processing unit 2c and that from the active sensor processing unit 4, thereby generating a combined track. The combined track is sent to the correction data calculation unit 6c. The data fusion processing in this procedure is common to known processing as shown in, for example, FIG. 11.

Correction data calculation processing (control input) is executed (ST231). That is, the correction data calculation unit 6c calculates the control input vector of the target based on the combined track from the data fusion unit 5. The control input vector is sent to the passive sensor processing unit 2c. The control input vector is used as correction data (control input vector) to calculate the target track based on the passive measurement from the passive sensor 1. The processing of steps ST201 to ST203 is continued until the end.

The processing contents of the correction data calculation unit 6c and the passive sensor processing unit 2c will be described next in detail. The motion model of the target is defined by $$x^i_{k+1} = F_{k+1} x^i_k + G_{k+1} u_k + G_{k+1} w^i_k \tag{41}$$

$$x^i_k = [\, a^i_k \ \ e^i_k \ \ \dot{a}^i_k \ \ \dot{e}^i_k \,]^T \tag{42}$$

$$u_k = [\, \ddot{a}_k \ \ \ddot{e}_k \,]^T \tag{43}$$

$$F_{k+1} = \begin{bmatrix} I_2 & (t_{k+1} - t_k) \cdot I_2 \\ O_2 & I_2 \end{bmatrix} \tag{44}$$

$$G_{k+1} = \begin{bmatrix} \frac{(t_{k+1} - t_k)^2}{2} \cdot I_2 \\ (t_{k+1} - t_k) \cdot I_2 \end{bmatrix} \tag{45}$$

$$Q^i_k = \frac{1}{r_k} \begin{bmatrix} (\sigma^{h,i}_k)^2 & 0 \\ 0 & (\sigma^{v,i}_k)^2 \end{bmatrix} \tag{46}$$

where $x^i_k$ is a state vector corresponding to the ith motion model and including an azimuth $a^i_k$, an elevation $e^i_k$, and their velocity components at a measurement time $t_k$, $u_k$ is the control input vector including the acceleration components of an azimuth $a_k$ and an elevation $e_k$ at the measurement time $t_k$, $F_{k+1}$ and $G_{k+1}$ are the transition matrix and the driving matrix from the measurement time $t_k$ to a measurement time $t_{k+1}$, respectively, $w^i_k$ is the process noise vector corresponding to the ith motion model at the measurement time $t_k$ for an average 0 and a covariance matrix $Q^i_k$, $\sigma^{h,i}_k$ and $\sigma^{v,i}_k$ are the standard deviations of the horizontal and vertical planes of process noise corresponding to the ith motion model at the measurement time $t_k$, respectively, $r_k$ is the distance from the passive sensor 1 to the target at the measurement time $t_k$, $A^T$ is the transposition of a vector or matrix A, $I_n$ is an n×n identity matrix, and $O_n$ is an n×n zero matrix.

The measurement model of the passive sensor 1 is the same as in the first embodiment. The processing contents of steps ST101, ST114, ST104, and ST105 are also the same as in the first embodiment. In step ST131, the control input vector calculated in step ST231 is input.

In step ST231, based on the combined track of the target output from the data fusion unit 5, the correction data calculation unit 6c calculates a control input vector (angular acceleration) $u_{k-1}$ as correction data by $$u_{k-1} = [\ddot{a}_{k-1} \ \ddot{e}_{k-1}]^T \tag{47}$$

Note that the control input vector (angular acceleration) $u_{k-1}$ can be calculated by $$u_{k-1} = \frac{\partial(\dot{a}_{k-1}, \dot{e}_{k-1})}{\partial(x_{k-1}, y_{k-1}, z_{k-1})}[\dot{x}_{k-1} \quad \dot{y}_{k-1} \quad \dot{z}_{k-1}]^T \quad (48)$$

$$= \begin{bmatrix} \frac{\partial \dot{a}_{k-1}}{\partial x_{k-1}} & \frac{\partial \dot{a}_{k-1}}{\partial y_{k-1}} & \frac{\partial \dot{a}_{k-1}}{\partial z_{k-1}} \\ \frac{\partial \dot{e}_{k-1}}{\partial x_{k-1}} & \frac{\partial \dot{e}_{k-1}}{\partial y_{k-1}} & \frac{\partial \dot{e}_{k-1}}{\partial z_{k-1}} \end{bmatrix} \begin{bmatrix} \dot{x}_{k-1} \\ \dot{y}_{k-1} \\ \dot{z}_{k-1} \end{bmatrix}$$

where $(x_{k-1}, y_{k-1}, z_{k-1})$, $(\dot{x}(\bullet)_{k-1}, \dot{y}(\bullet)_{k-1}, \dot{z}(\bullet)_{k-1})$, and $(\dot{a}(\bullet)_{k-1}, \dot{e}(\bullet)_{k-1})$ are vectors obtained by coordinate-converting the combined track input from the external device into the position vector, the velocity vector, and the angular velocity vector of the target viewed from the passive sensor 1.

In step ST132, using the result of update processing of the preceding measurement and the control input vector $u_{k-1}$, the passive sensor processing unit 2c executes prediction processing represented by $$\hat{x}^i_{k|k-1} = F_k \hat{x}^i_{k-1|k-1} + G_k u_{k-1} \quad (49)$$

$$P^i_{k|k-1} = F_k P^i_{k-1|k-1}(F_k)^T + G_k Q^i_{k-1}(G_k)^T \quad (50)$$

$$Q^i_{k-1} = \frac{1}{r_{preset}}\begin{bmatrix} (\sigma^{h,i}_{k-1})^2 & 0 \\ 0 & (\sigma^{v,i}_{k-1})^2 \end{bmatrix} \quad (51)$$

Since a true value $r_{k-1}$ of the target distance cannot be known, a preset target distance $r_{preset}$ is used when calculating a process noise covariance matrix $Q_{k-1}$ corresponding to the ith motion model.

As described above, according to the target tracking device of the third embodiment, the correction data calculation unit 6c calculates correction data (control input vector) based on the combined track output from the data fusion unit 5. The correction data is sent to the passive sensor processing unit 2c.

The passive sensor processing unit 2c uses, for track calculation, a predicted state indirectly calculated from the correction data (control input vector) from the correction data calculation unit 6c for each of the plurality of motion models. It is therefore possible to reduce the track error (bias component) from the passive sensor processing unit 2c for a target that performs non-maneuver and a target that performs maneuver. This allows to reduce the track error of the combined track calculated by the data fusion unit 5.

Note that although in the above description, a constant velocity model is used as the motion model of the target, the above-described processing is also applicable to another motion model such as a constant acceleration model. The control input vector $u_{k-1}$ is assumed to be the same for all processing of the motion models. Instead, the algorithm may be configured such that the control input vector $u_{k-1}$ takes a different value or differential order (for example, angular jerk (i.e. the rate of change of acceleration)) for each motion model. The passive sensor processing unit 2c may execute IMM filter processing or the like.

Fourth Embodiment

In a target tracking device according to the fourth embodiment, the functions of the correction data calculation unit 6a and the passive sensor processing unit 2a shown in FIG. 1 are slightly different from those of the first embodiment. In the fourth embodiment, reference numeral 6d denotes a correction data calculation unit; and 2d, a passive sensor processing unit. Only parts different from the target tracking device according to the first embodiment will be explained below.

The correction data calculation unit 6d calculates correction data based on a combined track sent from a data fusion unit 5. In the fourth embodiment, the target distance (distance from a passive sensor 1 to the target) and the control input vector are used as correction data. The correction data is sent to the passive sensor processing unit 2d.

Based on passive measurement from the passive sensor 1 and the correction data (target distance and control input vector) from the correction data calculation unit 6d, the passive sensor processing unit 2d calculates a predicted state for each of a plurality of motion models and updated state for each of the plurality of motion models. The passive sensor processing unit 2d also calculates an updated state by weighted sum of the updated states for the plurality of motion models, and sends the updated state to the data fusion unit 5 as the target track. The passive sensor processing unit 2d generates a control signal to control the posture and the like of the passive sensor 1 based on the target track, and sends the signal to the passive sensor 1. The functions of the target tracking device according to the fourth embodiment will be described next.

FIG. 5A is a flowchart illustrating the processing procedure of the passive sensor processing unit 2d of the target tracking device according to the fourth embodiment. FIG. 5B is a flowchart illustrating the processing procedure of the data fusion unit 5 and the correction data calculation unit 6d. Note that only processing procedures different from those of the first to third embodiments will be explained below.

When tracking processing starts, passive measurement is input (ST101). That is, the passive sensor 1 measures the target based on a control signal from the passive sensor processing unit 2d, calculates the passive measurement of the target, and sends it to the passive sensor processing unit 2d. The passive sensor processing unit 2d acquires the passive measurement sent from the passive sensor 1.

Correction data input processing (target distance) is executed (ST111). That is, the passive sensor processing unit 2d acquires the correction data (target distance) from the correction data calculation unit 6d.

Correction data input processing (control input) is executed (ST131). That is, the passive sensor processing unit 2d acquires the correction data (control input vector) from the correction data calculation unit 6d.

Covariance calculation processing is executed (ST112). That is, the passive sensor processing unit 2d calculates a process noise covariance matrix for each of the plurality of motion models based on the correction data (target distance) from the correction data calculation unit 6d.

Prediction processing is executed (ST132). That is, the passive sensor processing unit 2d calculates the predicted state of the target and its covariance matrix for each of the plurality of motion models based on the updated states of the target and their covariance matrices for the plurality of motion models, the correction data (control input vector) from the correction data calculation unit 6d, and the process noise covariance matrices for the plurality of motion models. The updated states of the target and their covariance matrices for the plurality of motion models are calculated in step ST114 of the preceding measurement. The process noise covariance matrices for the plurality of motion models are calculated in step ST112.

Update processing is then executed (ST114). That is, based on the passive measurement from the passive sensor 1 and the predicted states of the target and their covariance matrices for the plurality of motion models, the passive sensor processing unit 2d calculates the updated state of the target and its covariance matrix for each of the plurality of motion models. The passive sensor processing unit 2d also calculates the updated state of the target and its covariance matrix by weighted sum of the updated states of the target and their covariance matrix for the plurality of motion models. The updated state of the target and its covariance matrix are sent to the data fusion unit 5 as the target track. The predicted states of the target and their covariance matrices for the plurality of motion models are calculated in step ST132.

Control processing is executed (ST104). That is, based on the target track, the passive sensor processing unit 2d generates a control signal to control the posture and the like of the passive sensor 1 and sends the signal to the passive sensor 1. The processing of steps ST101 to ST105 is continued until the end.

Referring to FIG. 5B, the track is input to the data fusion unit 5 (ST201). That is, the data fusion unit 5 acquires the target track from the passive sensor processing unit 2d and that from an active sensor processing unit 4.

Data fusion processing is executed (ST202). That is, the data fusion unit 5 combines the target track from the passive sensor processing unit 2d and that from the active sensor processing unit 4, thereby generating a combined track. The combined track is sent to the correction data calculation unit 6d. The data fusion processing in this procedure is common to known processing as shown in, for example, FIG. 11.

Correction data calculation processing (target distance) is executed (ST211). That is, the correction data calculation unit 6d calculates the distance from the passive sensor 1 to the target based on the combined track from the data fusion unit 5. The target distance is sent to the passive sensor processing unit 2d. The target distance is used as correction data (target distance) to calculate the target track based on the passive measurement from the passive sensor 1.

Correction data calculation processing (control input) is executed (ST231). That is, the correction data calculation unit 6d calculates the control input vector of the target based on the combined track from the data fusion unit 5. The control input vector is sent to the passive sensor processing unit 2d. The processing of steps ST201 to ST203 is continued until the end.

The processing contents of the correction data calculation unit 6d and the passive sensor processing unit 2d will be described next in detail. The motion model of the target is the same as in the third embodiment. The measurement model of the passive sensor 1 is the same as in the first embodiment. The processing contents of steps ST101, ST111, ST112, ST114, ST104, and ST105 are the same as in the first embodiment. The processing contents of step ST131 are the same as in the third embodiment.

In step ST132, the correction data calculation unit 6d executes prediction processing using a process noise covariance matrix $Q^i_{k-1}$ corresponding to the ith motion model obtained by equation (26) in step ST112 in place of equation (51).

As described above, according to the target tracking device of the fourth embodiment, the correction data calculation unit 6d calculates correction data (target distance and control input vector) based on the combined track output from the data fusion unit 5. The passive sensor processing unit 2d uses, for track calculation, a predicted state and a filter gain (Kalman gain matrix) indirectly calculated from the correction data (target distance and control input vector) from the correction data calculation unit 6d for each of the plurality of motion models. It is therefore possible to reduce the track error (random component and bias component) of a target that performs non-maneuver and the track error (bias component) of a target that performs maneuver, which are output from the passive sensor processing unit 2d. This allows to reduce the track error of the combined track calculated by the data fusion unit 5.

Fifth Embodiment

In a target tracking device according to the fifth embodiment, the functions of the correction data calculation unit 6a and the passive sensor processing unit 2a shown in FIG. 1 are slightly different from those of the first embodiment. In the fifth embodiment, reference numeral 6e denotes a correction data calculation unit; and 2e, a passive sensor processing unit. Only parts different from the target tracking device according to the first embodiment will be explained below.

The correction data calculation unit 6e calculates the target distance (distance from a passive sensor 1 to the target), the process noise covariance matrix of the target, and the control input vector based on the target track including a process noise covariance matrix output from an active sensor processing unit 4. The target track corresponds to the combined track sent from a data fusion unit 5. The calculated target distance, process noise covariance matrix of the target, and control input vector are sent to the passive sensor processing unit 2e as correction data.

Based on passive measurement from the passive sensor 1 and the correction data (target distance, process noise covariance matrix, and control input vector) from the correction data calculation unit 6e, the passive sensor processing unit 2e calculates predicted state for each of a plurality of motion models and updated state for each of the plurality of motion models. The passive sensor processing unit 2e also calculates an updated state by weighted sum of the updated states for the plurality of motion models, and sends the value to the data fusion unit 5 as the target track. The passive sensor processing unit 2e generates a control signal to control the posture and the like of the passive sensor 1 based on the target track, and sends the signal to the passive sensor 1. The functions of the target tracking device according to the fifth embodiment will be described next.

Figures 6A, 6B:
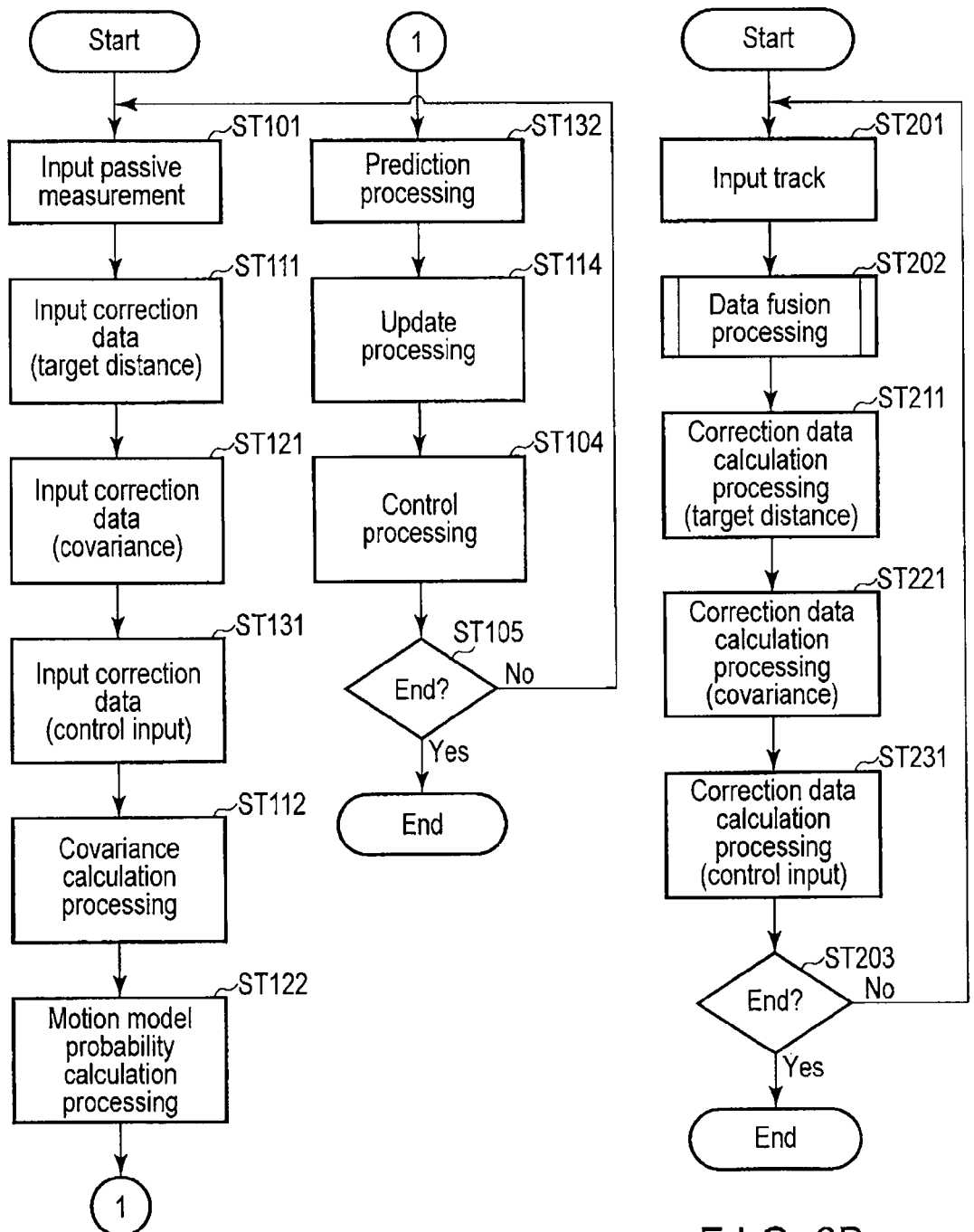
FIGS. 6A and 6B are flowcharts illustrating the procedure of target tracking processing performed by a target tracking device according to the fifth embodiment.

FIG. 6A is a flowchart illustrating the processing procedure of the passive sensor processing unit 2e of the target tracking device according to the fifth embodiment. FIG. 6B is a flowchart illustrating the processing procedure of the data fusion unit 5 and the correction data calculation unit 6e. Note that only processing procedures different from those of the first to fourth embodiments will be explained below.

Referring to FIG. 6A, when processing starts, passive measurement is input to the passive sensor processing unit 2e (ST101). That is, the passive sensor 1 measures the target based on a control signal from the passive sensor processing unit 2e, calculates the passive measurement, and sends it to the passive sensor processing unit 2e. The passive sensor processing unit 2e acquires the passive measurement sent from the passive sensor 1.

Correction data input processing (target distance) is executed (ST111). That is, the passive sensor processing unit 2e acquires the correction data (target distance) from the correction data calculation unit 6e.

Correction data input processing (covariance) is executed (ST121). That is, the passive sensor processing unit 2e acquires the correction data (process noise covariance matrix) from the correction data calculation unit 6e.

Correction data input processing (control input) is executed (ST131). That is, the passive sensor processing unit 2e acquires the correction data (control input vector) from the correction data calculation unit 6e.

Covariance calculation processing is executed (ST112). That is, the passive sensor processing unit 2e calculates a process noise covariance matrix for each of the plurality of motion models based on the correction data (target distance) from the correction data calculation unit 6e.

Motion model probability calculation processing is then executed (ST122). That is, the passive sensor processing unit 2e calculates a motion model probability for each of the plurality of motion models based on the correction data (process noise covariance matrix) from the correction data calculation unit 6e.

Prediction processing is executed (ST132). That is, the passive sensor processing unit 2e calculates the predicted state of the target and its covariance matrix for each of the plurality of motion models based on the updated states of the target and their covariance matrices for the plurality of motion models, the correction data (control input vector) from the correction data calculation unit 6e, and the process noise covariance matrices for the plurality of motion models. The updated states of the target and their covariance matrices for the plurality of motion models are calculated in step ST114 of the preceding measurement. The process noise covariance matrices for the plurality of motion models are calculated in step ST112.

Update processing is then executed (ST114). That is, based on the passive measurement from the passive sensor 1 and the predicted states of the target and their covariance matrices for the plurality of motion models, the passive sensor processing unit 2e calculates the updated state of the target and its covariance matrix for each of the plurality of motion models. The passive sensor processing unit 2e also calculates the updated state of the target and its covariance matrix by weighted sum of the updated states and their covariance matrix. The updated state of the target and its covariance matrix are sent to the data fusion unit 5 as the target track. The predicted states of the target and their covariance matrices for the plurality of motion models are calculated in step ST132.

Control processing is executed (ST104). That is, based on the target track, the passive sensor processing unit 2e generates a control signal to control the posture and the like of the passive sensor 1. The control signal is sent to the passive sensor 1. The processing of steps ST101 to ST105 is continued until the end.

Referring to FIG. 6B, the track is input to the data fusion unit 5 (ST201). That is, the data fusion unit 5 acquires the target track from the passive sensor processing unit 2e and that from the active sensor processing unit 4.

Data fusion processing is executed (ST202). That is, the data fusion unit 5 combines the target track from the passive sensor processing unit 2e and that from the active sensor processing unit 4, thereby generating a combined track. The combined track is sent to the correction data calculation unit 6e. The data fusion processing in this procedure is common to known processing as shown in, for example, FIG. 11.

Correction data calculation processing (target distance) is executed (ST211). That is, the correction data calculation unit 6e calculates the distance from the passive sensor 1 to the target based on the combined track from the data fusion unit 5. The target distance is sent to the passive sensor processing unit 2e. The target distance is used as correction data (target distance) to calculate the target track based on the passive measurement from the passive sensor 1.

Correction data calculation processing (covariance) is executed (ST221). That is, the correction data calculation unit 6e calculates the process noise covariance matrix of the target based on the combined track from the data fusion unit 5 and the target track output from the active sensor processing unit 4. The process noise covariance matrix is sent to the passive sensor processing unit 2e as the correction data (process noise covariance matrix). The target track output from the active sensor processing unit 4 corresponds to the combined track and includes the process noise covariance matrix.

Correction data calculation processing (control input) is executed (ST231). That is, the correction data calculation unit 6e calculates the control input vector of the target based on the combined track from the data fusion unit 5. The control input vector is sent to the passive sensor processing unit 2e as the correction data (control input vector). The loop of steps ST201 to ST203 is repeated until the end.

The processing contents of the correction data calculation unit 6e and the passive sensor processing unit 2e will be described next in detail. The motion model of the target is the same as in the third embodiment. The measurement model of the passive sensor 1 is the same as in the first embodiment. The processing contents of steps ST101, ST111, ST112, ST104, and ST105 are the same as in the first embodiment. The processing contents of steps ST121 and ST122 are the same as in the second embodiment. The processing contents of step ST131 are the same as in the third embodiment.

In step ST132, the correction data calculation unit 6e executes prediction processing using a process noise covariance matrix $Q^i_{k-1}$ corresponding to the ith motion model obtained by equation (26) in step ST112 in place of equation (51).

In step ST114, the correction data calculation unit 6e executes update processing using a motion model probability $p^i_{k-1}$ corresponding to the ith motion model, which is calculated by equation (40) in step ST122 in place of equation (34) of update processing of the preceding measurement (step ST114).

As described above, according to the target tracking device of the fifth embodiment, the correction data calculation unit 6e calculates correction data (target distance, process noise covariance matrix, and control input vector) based on the combined track output from the data fusion unit 5 and the target track (corresponding to the combined track and including a process noise covariance matrix) output from the active sensor processing unit 4, and sends the correction data to the passive sensor processing unit 2e. The passive sensor processing unit 2e uses, for track calculation, a predicted state and a filter gain (Kalman gain matrix) indirectly calculated from the correction data (target distance and control input vector) from the correction data calculation unit 6e for each of the plurality of motion models. This makes it possible to reduce the track error (random component and bias component) of a target that performs non-maneuver and the track error (bias component) of a target that performs maneuver, which are output from the passive sensor processing unit 2e.

Additionally, the passive sensor processing unit 2e uses, for track calculation, the motion model probability indirectly calculated from the correction data (process noise covariance matrix) for each of the plurality of motion models. This allows to reduce the track error from the passive sensor processing unit 2e for both a target that performs non-maneuver and a target that performs maneuver at initial tracking stage when the number of times of measurement is small. Also, this allows to reduce the track error from the passive sensor processing unit 2e for both the target that performs non-maneuver and the target that performs maneuver even when the motion model of the target has changed after the preceding measurement. Therefore, the track error of the combined track calculated by the data fusion unit 5 is reduced.

Modified Embodiment

Figure 8:
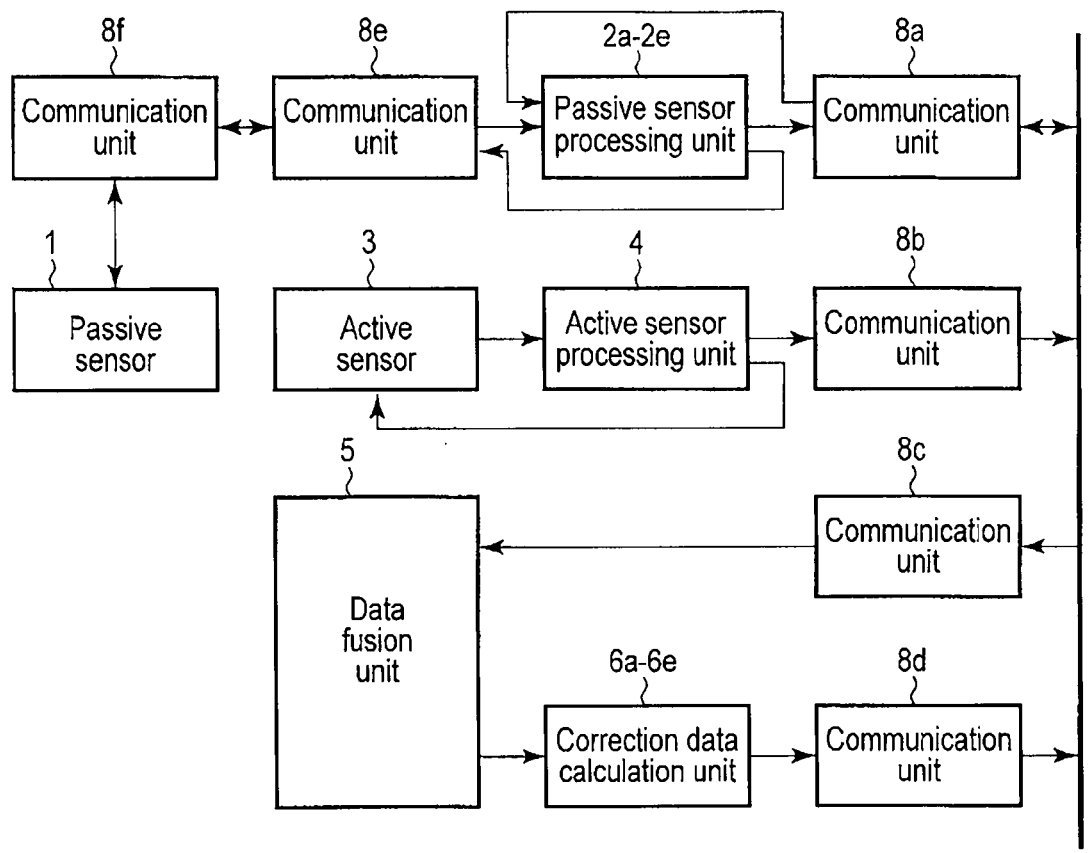
FIG. 8 is a block diagram showing the arrangement of a target tracking device according to another modification of the first to fifth embodiments.

The target tracking devices according to the first to fifth embodiments can be modified as shown in FIGS. 7 and 8. A target tracking device shown in FIG. 7 comprises the plurality of passive sensor processing units 2a to 2e, the plurality of correction data calculation units 6a to 6e, and communication units 7a to 7d. The passive sensor processing units 2a to 2e are connected to the data fusion unit 5 via the communication units 7a and 7c. The active sensor processing unit 4 is connected to the data fusion unit 5 via the communication units 7b and 7c. The correction data calculation units 6a to 6e are connected to the passive sensor processing units 2a to 2e via the communication units 7a and 7d. This allows to separate the block including the passive sensor 1, the passive sensor processing units 2a to 2e, the active sensor 3, and the active sensor processing unit 4 from the block including the data fusion unit 5 and the correction data calculation units 6a to 6e.

In FIG. 8, communication units 8e and 8f are added to the target tracking device shown in FIG. 7. The communication units 8e and 8f connect the passive sensor 1 to the passive sensor processing units 2a to 2e. This allows to separate the block including the passive sensor 1, the block including the passive sensor processing units 2a to 2e, the active sensor 3, and the active sensor processing unit 4, and the block including the data fusion unit 5 and the correction data calculation units 6a to 6e from each other.

In any of the modifications, the same effects as described in the first to fifth embodiments can be obtained.

As described above, according to the target tracking device of each of the above-described embodiments, the data fusion unit calculates a combined track based on target tracks given by the passive sensor and the active sensor. The correction data calculation unit calculates correction data based on the combined track. The correction data is used to calculate the target track based on the passive measurement from the passive sensor.

The passive sensor processing unit calculates the target track for each of the plurality of motion models based on the correction data from the correction data calculation unit. The passive sensor processing unit calculates the target track by weighted sum of the target tracks for the plurality of motion models. This enables to improve the tracking performance from the passive sensor processing unit. Hence, the accuracy of combined track calculation by the data fusion unit can be improved. It is therefore possible to obtain a target tracking device having improved tracking performance for both a target that performs non-maneuver and a target that performs maneuver.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A target tracking device comprising:
a passive sensor processing unit configured to calculate passive track of a target based on passive measurement of the target angle measured by a passive sensor;
an active sensor processing unit configured to calculate active track of the target based on active measurement of the target distance and angle measured by an active sensor;
a data fusion unit configured to combine the passive track and the active track and outputs a combined track when the passive track and the active track are from a same target; and
a correction unit configured to calculate correction data based on the combined track,
wherein the passive sensor processing unit
calculates track of the target for each of a plurality of motion models based on the passive measurement and the correction data, and
calculates the passive track by weighted sum of all tracks for the motion models.

2. The target tracking device of claim 1, wherein
the correction unit calculates distance data from the passive sensor to the target based on the combined track, and
the passive sensor processing unit
calculates a process noise covariance matrix for each of the motion models based on the distance data, and
calculates the track for each of the motion models based on the process noise covariance matrix for each of the motion models.

3. The target tracking device of claim 1, wherein
the active sensor processing unit calculates a process noise covariance matrix concerning the track of the target based on the active measurement,
the correction unit calculates distance data from the passive sensor to the target and the process noise covariance matrix of the target at a position of the passive sensor based on the combined track and the active track including the process noise covariance matrix corresponding to the combined track, and
the passive sensor processing unit
calculates a process noise covariance matrix and a motion model probability for each of the plurality of motion models based on the distance data and the process noise covariance matrix of the target at the position of the passive sensor, and
calculates the track for each of the motion models based on the calculated process noise covariance matrix and motion model probability for each of the motion models.

4. The target tracking device of claim 1, wherein
the correction unit calculates a control input of the target at a position of the passive sensor based on the combined track, and
the passive sensor processing unit
calculates a predicted state of the target for each of the plurality of motion models based on the control input, and
calculates the track for each of the motion models based on the predicted state for each of the motion models.

5. The target tracking device of claim 1, wherein
the correction unit
calculates a control input of the target at a position of the passive sensor based on the combined track, and
calculates distance data from the passive sensor to the target based on the combined track, and
the passive sensor processing unit
calculates a predicted state of the target for each of the plurality of motion models based on the control input,
calculates a process noise covariance matrix for each of the motion models based on the distance data, and calculates the track for each of the motion models based on the predicted state and the process noise covariance matrix for each of the motion models.

6. The target tracking device of claim 1, wherein
the active sensor processing unit calculates a process noise covariance matrix concerning the track of the target based on the active measurement,
the correction unit calculates a control input of the target at a position of the passive sensor, distance data from the passive sensor to the target, and the process noise covariance matrix of the target at the position of the passive sensor based on the combined track and the active track including the process noise covariance matrix corresponding to the combined track, and
the passive sensor processing unit
calculates a predicted state of the target for each of the plurality of motion models based on the control input,
calculates a process noise covariance matrix and a motion model probability for each of the motion models based on the distance data and the process noise covariance matrix of the target at the position of the passive sensor, and
calculates the track for each of the motion models based on the calculated predicted state, process noise covariance matrix, and motion model probability for each of the motion models.

7. A target tracking method applied to a target tracking device, wherein the device includes:
a passive sensor processing unit configured to calculate passive track of a target based on passive measurement of the target angle measured by a passive sensor;
an active sensor processing unit configured to calculate active track of the target based on active measurement of the target distance and angle measured by an active sensor;
a data fusion unit configured to combine the passive track and the active track and outputs a combined track when the passive track and the active track are from same target; and
a correction unit configured to calculate correction data based on the combined track,
wherein the method comprising:
calculating, by the passive sensor processing unit, track of the target for each of a plurality of motion models based on the passive measurement and the correction data; and
calculating, by the passive sensor processing unit, the passive track by weighted sum of all tracks for the motion models.

8. The target tracking method of claim 7, wherein
the calculating the correction data includes calculating distance data from the passive sensor to the target based on the combined track,
the calculating the passive track includes calculating a process noise covariance matrix for each of the motion models based on the distance data, and
the calculating the passive track includes calculating the track for each of the motion models based on the process noise covariance matrix for each of the motion models.

9. The target tracking method of claim 7, further comprising:
calculating, by the active sensor processing unit, a process noise covariance matrix concerning the track of the target based on the active measurement,
wherein the calculating the correction data includes calculating distance data from the passive sensor to the target and the process noise covariance matrix of the target at a position of the passive sensor based on the combined track and the active track including the process noise covariance matrix corresponding to the combined track,
the calculating the passive track includes calculating a process noise covariance matrix and a motion model probability for each of the plurality of motion models based on the distance data and the process noise covariance matrix of the target at the position of the passive sensor, and
the calculating the passive track includes calculating the track for each of the motion models based on the calculated process noise covariance matrix and motion model probability for each of the motion models.

10. The target tracking method of claim 7, wherein
the calculating the correction data includes calculating a control input of the target at a position of the passive sensor based on the combined track,
the calculating the passive track includes calculating a predicted state of the target for each of the plurality of motion models based on the control input, and
the calculating the passive track includes calculating the track for each of the motion models based on the predicted state for each of the motion models.

11. The target tracking method of claim 7, wherein
the calculating the correction data includes calculating a control input of the target at a position of the passive sensor based on the combined track,
the calculating the correction data includes calculating distance data from the passive sensor to the target based on the combined track,
the calculating the passive track includes calculating a predicted state of the target for each of the plurality of motion models based on the control input,
the calculating the passive track includes calculating a process noise covariance matrix for each of the motion models based on the distance data, and
the calculating the passive track includes calculating the track for each of the motion models based on the predicted state and the process noise covariance matrix for each of the motion models.

12. The target tracking method of claim 7, further comprising:
calculating, by the active sensor processing unit, a process noise covariance matrix concerning the track of the target based on the active measurement,
wherein the calculating the correction data includes calculating a control input of the target at a position of the passive sensor, distance data from the passive sensor to the target, and the process noise covariance matrix of the target at the position of the passive sensor based on the combined track and the active track including the process noise covariance matrix corresponding to the combined track,
the calculating the passive track includes calculating a predicted state of the target for each of the plurality of motion models based on the control input,
the calculating the passive track includes calculating a process noise covariance matrix and a motion model probability for each of the motion models based on the distance data and the process noise covariance matrix of the target at the position of the passive sensor, and
the calculating the passive track includes calculating the track for each of the motion models based on the calculated predicted state, process noise covariance matrix, and motion model probability for each of the motion models.

* * * * *